US011359079B2

(12) United States Patent
Lavallée et al.

(10) Patent No.: US 11,359,079 B2
(45) Date of Patent: Jun. 14, 2022

(54) POLYMER PROCESSING ADDITIVE, COMPOSITIONS, AND METHODS

(71) Applicant: 3M INNOVATIVE PROPERTIES COMPANY, St. Paul, MN (US)

(72) Inventors: Claude Lavallée, Maplewood, MN (US); Shireen A. Mamun, Woodbury, MN (US)

(73) Assignee: 3M Innovative Properties Company, St. Paul, MN (US)

(*) Notice: Subject to any disclaimer, the term of this patent is extended or adjusted under 35 U.S.C. 154(b) by 0 days.

(21) Appl. No.: 15/022,842

(22) PCT Filed: Sep. 19, 2014

(86) PCT No.: PCT/US2014/056581
§ 371 (c)(1),
(2) Date: Mar. 17, 2016

(87) PCT Pub. No.: WO2015/042415
PCT Pub. Date: Mar. 26, 2015

(65) Prior Publication Data
US 2016/0229994 A1    Aug. 11, 2016

Related U.S. Application Data

(60) Provisional application No. 61/880,306, filed on Sep. 20, 2013.

(51) Int. Cl.
| | |
|---|---|
| *C08L 23/06* | (2006.01) |
| *C08K 3/22* | (2006.01) |
| *C08K 5/09* | (2006.01) |
| *B29C 48/00* | (2019.01) |
| *B29C 48/80* | (2019.01) |
| *B29C 48/86* | (2019.01) |
| *C08L 71/02* | (2006.01) |
| *C08L 23/08* | (2006.01) |
| *C08L 27/12* | (2006.01) |
| *B29B 7/74* | (2006.01) |
| *B29B 7/88* | (2006.01) |
| *B29B 7/38* | (2006.01) |
| *B29B 7/18* | (2006.01) |
| *B29B 7/24* | (2006.01) |
| *B29K 105/00* | (2006.01) |
| *B29K 105/16* | (2006.01) |

(52) U.S. Cl.
CPC ............ *C08L 23/06* (2013.01); *B29B 7/7461* (2013.01); *B29B 7/7485* (2013.01); *B29B 7/88* (2013.01); *B29C 48/022* (2019.02); *B29C 48/802* (2019.02); *B29C 48/865* (2019.02); *C08K 3/22* (2013.01); *C08K 5/09* (2013.01); *C08L 23/0815* (2013.01); *C08L 27/12* (2013.01); *C08L 71/02* (2013.01); *B29B 7/183* (2013.01); *B29B 7/244* (2013.01); *B29B 7/38* (2013.01); *B29K 2023/06* (2013.01); *B29K 2105/0044* (2013.01); *B29K 2105/0094* (2013.01); *B29K 2105/16* (2013.01); *B29K 2995/0017* (2013.01); *C08L 2310/00* (2013.01)

(58) Field of Classification Search
CPC ........... C08L 23/00–0815; C08L 71/02; C08L 27/12; C08K 5/09
See application file for complete search history.

(56) References Cited

U.S. PATENT DOCUMENTS

| | | | |
|---|---|---|---|
| 2,968,649 | A | 1/1961 | Pailthorp |
| 3,051,677 | A | 8/1962 | Rexford |
| 3,318,854 | A | 5/1967 | Honn |
| 3,326,984 | A | 6/1967 | Anderson |
| 4,141,874 | A | 2/1979 | Oka |
| 4,273,728 | A | 6/1981 | Krespan |
| 4,534,799 | A | 8/1985 | Aguirre |
| 4,535,113 | A | 8/1985 | Foster |
| 4,540,538 | A | 9/1985 | Corwin |
| 4,558,141 | A | 12/1985 | Squire |
| 4,829,116 | A | 5/1989 | Piesold |
| 4,840,994 | A | 6/1989 | Moggi |
| 4,855,360 | A | 8/1989 | Duchesne |
| 4,900,474 | A | 2/1990 | Terae |
| 4,904,735 | A | 2/1990 | Chapman, Jr. |

(Continued)

FOREIGN PATENT DOCUMENTS

| | | |
|---|---|---|
| CN | 101891914 | 11/2010 |
| DE | 4421420 | 12/1995 |

(Continued)

OTHER PUBLICATIONS

Neumann, "Fluoropolymer Processing Additives with Improved Color Stability", IP.com Journal, Oct. 14, 2008, 7 Pages.

Ittel, "Late-Metal Catalysts for Ethylene Homo- and Copolymerization", Chemical Review, 2000, vol. 100, No. 4, pp. 1169-1203.

Johnson, "The influence of Polyolefin Additives on the Performance of Fluorocarbon Elastomer Process Aids", SPE ANTEC, Apr. 18-21, 1988, Atlanta, pp. 1425-1429.

Johnson; "Factors Affecting the Interaction of Polyolefin Additives with Fluorocarbon Elastomer Polymer Processing Aids", TAPPI Polymers, Laminations and Coatings Conference, Sep. 13-16, 1998, Atlanta, Georgia, 12pgs.

Kanu, "Rheology of Polymer Blends: Simultaneous Slippage and Entrance Pressure Loss in the Ethylene-Propylene-Diene (EPDM)/Viton System", Polymer Engineering and Science, Mid-Jun. 1982, vol. 22, No. 8, pp. 507-511.

(Continued)

Primary Examiner — Wenwen Cai
(74) Attorney, Agent, or Firm — Kathleen B. Gross

(57) ABSTRACT

A poly(oxyalkylene) polymer and a metal salt of a carboxylic acid, sulfonic acid, or alkylsulfate, in combination are useful as a polymer processing additive synergist. Polymer processing additive compositions, homogeneously catalyzed olefin compositions, and other extrudable polymer compositions including a poly(oxyalkylene) polymer and a metal salt of a carboxylic acid, sulfonic acid, or alkylsulfate are disclosed. Methods of reducing melt defects during the extrusion of a thermoplastic polymer, which may be a homogeneously catalyzed polyolefin, are also disclosed.

20 Claims, No Drawings

(56) References Cited

U.S. PATENT DOCUMENTS

| | | |
|---|---|---|
| 5,010,130 A | 4/1991 | Chapman, Jr. |
| 5,013,792 A | 5/1991 | Chapman, Jr. |
| 5,015,693 A | 5/1991 | Duchesne |
| 5,028,679 A | 7/1991 | Terae |
| 5,061,759 A | 10/1991 | Tommasi |
| 5,064,594 A | 11/1991 | Priester |
| 5,089,200 A | 2/1992 | Chapman, Jr. |
| 5,093,400 A | 3/1992 | Arcella |
| 5,106,911 A | 4/1992 | Chapman, Jr. |
| 5,118,775 A | 6/1992 | Inomata |
| 5,132,368 A | 7/1992 | Chapman, Jr. |
| 5,155,282 A | 10/1992 | Marchionni |
| 5,236,997 A | 8/1993 | Fujiki |
| 5,244,955 A | 9/1993 | Toyoda |
| 5,266,639 A | 11/1993 | Chapman, Jr. |
| 5,284,184 A | 2/1994 | Noone |
| 5,285,002 A | 2/1994 | Grootaert |
| 5,378,782 A | 1/1995 | Grootaert |
| 5,397,829 A | 3/1995 | Morgan |
| 5,442,097 A | 8/1995 | Obermeier |
| 5,464,904 A | 11/1995 | Chapman, Jr. |
| 5,527,858 A | 6/1996 | Blong |
| 5,550,193 A | 8/1996 | Chiu |
| 5,587,429 A | 12/1996 | Priester |
| 5,710,217 A | 1/1998 | Blong |
| 5,719,209 A | 2/1998 | Miller |
| 6,277,919 B1 | 8/2001 | Dillon |
| 6,294,604 B1 | 9/2001 | Focquet |
| 6,300,526 B1 | 10/2001 | Navarrini |
| 6,380,313 B1 | 4/2002 | Dillon |
| 6,599,982 B2 | 7/2003 | Oriani |
| 6,613,941 B1 | 9/2003 | Felix |
| 6,706,193 B1 | 3/2004 | Burkard |
| 6,734,252 B1 | 5/2004 | Woods |
| 6,780,481 B1 | 8/2004 | Lavallée |
| 6,794,550 B2 | 9/2004 | Hintzer |
| 6,818,695 B2 | 11/2004 | Dillon |
| 6,894,118 B2 | 5/2005 | Chapman, Jr. |
| 7,001,951 B2 | 2/2006 | Chapman, Jr. |
| 7,018,541 B2 | 3/2006 | Hintzer |
| 7,375,157 B2 | 5/2008 | Amos |
| 7,420,010 B2 | 9/2008 | Sukhadia |
| 7,488,838 B2 | 2/2009 | Daute |
| 8,501,862 B2 | 8/2013 | Bonnet |
| 2004/0192818 A1 | 9/2004 | Oriani |
| 2005/0070644 A1 | 3/2005 | Tikuisis |
| 2005/0101722 A1 | 5/2005 | Briers |
| 2005/0245687 A1 | 11/2005 | Appel |
| 2005/0281973 A1 | 12/2005 | Park |
| 2009/0197028 A1 | 8/2009 | Lyons |
| 2010/0311906 A1 | 12/2010 | Lavallée |
| 2011/0172338 A1 | 7/2011 | Murakami |
| 2011/0244159 A1 | 10/2011 | Papp |

FOREIGN PATENT DOCUMENTS

| | | | | |
|---|---|---|---|---|
| EP | 0222201 | 5/1987 | | |
| EP | 0295717 | 12/1988 | | |
| EP | 0310966 | 4/1989 | | |
| EP | 1462483 | 9/2004 | | |
| WO | WO 1991-04842 | 4/1991 | | |
| WO | WO 1991-05007 | 4/1991 | | |
| WO | WO 1991-05009 | 4/1991 | | |
| WO | WO-9426816 A1 * | 11/1994 | ............. | C08F 10/00 |
| WO | WO 2005-111144 | 11/2005 | | |
| WO | WO 2009-094348 | 7/2009 | | |
| WO | WO 2010-024602 | 3/2010 | | |
| WO | WO 2010-037071 | 4/2010 | | |
| WO | WO 2013-078534 | 6/2013 | | |
| WO | WO 2014-085126 | 5/2014 | | |

OTHER PUBLICATIONS

Morris, "Metallic Stearates: A Review of Their Function and Use as Release Agents for Rubber Compounds", HallStar Technical Publication, 11 pages.

B.V. Johnson, T.J. Blong, J.M. Kunde, D. Duchesne; *Factors Affecting the Interactions of Polyolefin Additives with Fluorocaron Elastomer Processing Aids*, TAPPI PLC Conference, Sep. 13, 1988, 11 pages.

J. Horns, E. Adair; *The Effect Fluoropolymer Processing Additive and Stearate Additive Levels Have on Processing of HDPE Resins*, Dyneon Paper 98-0504-1084-8, (Oct. 2001), 11 pages.

T. Blong, K. Fronek, B. Johnson, D. Klein, J. Kunde; *Processing Additives and Acid Neutralizers—Formulation Options in Polyolefins*, SPE Polyolefins VII International Conference, Feb. 27, 1991, 15 pages.

Oleg Kulikov, Klaus Hornung, Manfred Wagner; *Low Viscous Hydrophilic Processing Additives for Extrusion of Polyethylene at Reduced Temperatures*; Polymer Engineering and Science (2010); 1237-1252.

Rauwendaal, "Polymer Extrusion", Hanser Publishers, 1986 pp. 23-48.

Shroff, "Assessment of NMR and Rheology for the Characterization of LCB in Essentially Linear Polyethylenes", Macromolecules, 2001, vol. 34, No. 21, pp. 7362-7367.

Shroff, "Long-Chain-Branching Index for Essentially Linear Polyethylenes", Macromolecules, 1999, vol. 32, No. 25, pp. 8454-8464.

Westover, "Melt Extrusion", Encyclopedia of Polymer Science and Technology, 1968, vol. 8, pp. 573-581.

International Search Report for PCT International Application No. PCT/US2014/056581, dated Nov. 27, 2014, 4 pages.

* cited by examiner

POLYMER PROCESSING ADDITIVE, COMPOSITIONS, AND METHODS

CROSS REFERENCE TO RELATED APPLICATIONS

This application is a national stage filing under 35 U.S.C. 371 of PCT/US2014/056581, filed Sep. 19, 2014, which claims the benefit of U.S. Ser. No. 61/880,306, filed Sep. 20, 2013, the disclosure of which is incorporated by reference in its entirety herein.

BACKGROUND

Extrusion of polymeric materials in the formation and shaping of articles is a major segment of the plastic or polymeric articles industry. The quality of the extruded article and the overall success of the extrusion process are typically influenced by the interaction of the fluid material with the extrusion die. For any melt-processable thermoplastic polymer composition, there exists a critical shear rate above which the surface of the extrudate becomes rough or distorted and below which the extrudate will be smooth. See, for example, R. F. Westover, Melt Extrusion, Encyclopedia of Polymer Science and Technology, vol. 8, pp. 573-81 (John Wiley & Sons 1968). The desire for a smooth extrudate surface competes, and must be optimized with respect to, the economic advantages of extruding a polymer composition at the fastest possible speed (for example at high shear rates).

At low shear rates, defects in extruded thermoplastics may take the form of "sharkskin", which is a loss of surface gloss that in more serious manifestations appears as ridges running more or less transverse to the extrusion direction. At higher rates, the extrudate can undergo "continuous melt fracture" becoming grossly distorted. At rates lower than those at which continuous melt fracture is first observed, certain thermoplastics can also suffer from "cyclic melt fracture", in which the extrudate surface varies from smooth to rough.

There are other problems often encountered during the extrusion of thermoplastic polymers. They include a build-up of the polymer at the orifice of the die (known as die build up or die drool), increase in back pressure during extrusion runs, and excessive degradation or low melt strength of the polymer due to high extrusion temperatures. These problems slow the extrusion process either because the process must be stopped to clean the equipment or because the process must be run at a lower speed.

The addition of fluoropolymers can at least partially alleviate melt defects in extrudable thermoplastic polymers and can be used as polymer processing additive, such as described, for example, in U.S. Pat. Nos. 5,015,693 and 4,855,013 (Duchesne et al.), U.S. Pat. No. 5,701,217 (Blong et al.), and U.S. Pat. No. 6,277,919 (Dillon et al.) Certain silicones have also been reported to be useful as polymer processing additives for reducing melt defects (see U.S. Pat. No. 4,535,113 (Foster et al.)). Some benefits of polymer processing additives include the elimination of melt fracture and surface defects, a reduction in extrusion pressure, and the elimination of die build-up.

The use of polyethylene glycol in extrusion processing of thermoplastics has been described. U.S. Pat. No. 5,015,693 (Duchesne et al.) discloses that a combination of a fluoropolymer and a poly(oxyalkylene) polymer is more effective than a fluoropolymer alone for reducing melt defects under certain conditions. U.S. Pat. No. 6,294,604 (Focquet et al.) describes a combination of a fluoropolymer, a poly(oxyalkylene) polymer, and magnesium oxide as an extrusion additive.

SUMMARY

We have discovered that combinations of a poly(oxyalkylene) polymer (e.g., a polyethylene glycol) and a metal salt of a carboxylic acid, a sulfonic acid, or an alkylsulfate typically have significantly higher thermal stability than the poly(oxyalkylene) polymer alone. Improved thermal stability of the poly(oxyalkylene) polymer increases its utility as a polymer processing additive synergist by allowing polymer processing, including master batch processing and extrusion, at higher temperatures.

Thus, in one aspect, the present disclosure provides a composition including a homogeneously catalyzed polyolefin, a silicone-containing polymer or fluoropolymer polymer processing additive, and a polymer processing additive synergist including a poly(oxyalkylene) polymer and a metal salt of a carboxylic acid, sulfonic acid, or alkylsulfate. In some embodiments, the homogeneously catalyzed polyolefin is a metallocene-catalyzed polyolefin.

In another aspect, the present disclosure provides a method of reducing melt defects during the extrusion of a homogeneously catalyzed polyolefin. The method includes extruding the composition including the homogeneously catalyzed polyolefin, the silicone-containing polymer or fluoropolymer polymer processing additive, and the polymer processing additive synergist including the poly(oxyalkylene) polymer and the metal salt of a carboxylic acid, sulfonic acid, or alkylsulfate. In some embodiments, the homogeneously catalyzed polyolefin is a metallocene-catalyzed polyolefin.

In another aspect, the present disclosure provides a method of reducing melt defects during the extrusion of a thermoplastic polymer. The method includes providing a polymer processing additive composition including a polymer processing additive selected from the group consisting of a fluoropolymer and a silicone-containing polymer and a polymer processing additive synergist comprising a poly (oxyalkylene) polymer and a metal salt of a carboxylic acid, sulfonic acid, or alkylsulfate; providing an extrudable polymer; admixing the polymer processing additive composition and the extrudable polymer to provide an extrudable composition; and extruding the composition.

In another aspect, the present disclosure provides a polymer processing additive composition that includes a fluoropolymer, a poly(oxyalkylene) polymer, and a metal salt of a carboxylic acid, sulfonic acid, or alkylsulfate. Accordingly, the present disclosure provides the use of a composition including a fluoropolymer, a poly(oxyalkylene) polymer, and a metal salt of a carboxylic acid, sulfonic acid, or alkylsulfate as a polymer processing additive. In some embodiments, the poly(oxyalkylene) polymer is present in an amount of at least 50% by weight, based on the total weight of the polymer processing additive composition, and the metal salt is other than calcium stearate. In some embodiments, the poly(oxyalkylene) polymer is present in an amount of at least 85% by weight, based on the total weight of the poly(oxyalkylene) polymer and the metal salt, and the metal salt is other than calcium stearate.

In another aspect, the present disclosure provides a polymer processing additive synergist that includes a poly(oxyalkylene) polymer and a metal salt of a carboxylic acid, sulfonic acid, or alkylsulfate. The polymer processing additive synergist does not include a fluoropolymer or a polyolefin.

In another aspect, the present disclosure provides a polymer processing additive composition including a silicone-containing polymer processing additive and the polymer processing additive synergist including in poly(oxyalkylene) polymer and a metal salt of a carboxylic acid, sulfonic acid, or alkylsulfate. According, the present disclosure also provides the use of a composition including a silicone-containing polymer processing additive, a poly(oxyalkylene) polymer, and a metal salt of a carboxylic acid, sulfonic acid, or alkylsulfate as a polymer processing additive.

In another aspect, the present disclosure provides the use of a poly(oxyalkylene) polymer and a metal salt of a carboxylic acid, sulfonic acid, or alkylsulfate as a polymer processing additive synergist. The synergist is useful, for example, for allowing extrusion of polymers and master batch processing at higher temperatures.

As described below, combinations of a poly(oxyalkylene) polymer (e.g., a polyethylene glycol) and a metal salt of a carboxylic acid, a sulfonic acid, or an alkylsulfate typically have higher thermal stability than a combination of poly (oxyalkylene) polymer and magnesium oxide. Furthermore, combinations of a poly(oxyalkylene) polymer (e.g., a polyethylene glycol) and a metal salt of a carboxylic acid, a sulfonic acid, or an alkylsulfate typically have higher thermal stability than a combination of poly(oxyalkylene) polymer and certain conventional anti-oxidants.

Also, as described below, a polymer processing additive synergist disclosed herein including a poly(oxyalkylene) polymer and a metal salt of a carboxylic acid, sulfonic acid, or alkylsulfate is useful in a composition including a polymer processing additive and a homogeneously catalyzed polyolefin. For homogeneously catalyzed polyolefins (e.g., polyolefins catalyzed by metallocenes or other single site catalysts), unlike polyolefins prepared from other conventional catalysts, acidic residues are generally not present; therefore acid-neutralizing additives such as zinc stearate and calcium stearate are generally not required to be added to homogeneously catalyzed polyolefins.

In this application:

Terms such as "a", "an" and "the" are not intended to refer to only a singular entity, but include the general class of which a specific example may be used for illustration. The terms "a", "an", and "the" are used interchangeably with the term "at least one".

The phrase "comprises at least one of" followed by a list refers to comprising any one of the items in the list and any combination of two or more items in the list. The phrase "at least one of" followed by a list refers to any one of the items in the list or any combination of two or more items in the list.

"Alkyl group" and the prefix "alk-" are inclusive of both straight chain and branched chain groups and of cyclic groups having up to 30 carbons (in some embodiments, up to 20, 15, 12, 10, 8, 7, 6, or 5 carbons) unless otherwise specified. Cyclic groups can be monocyclic or polycyclic and, in some embodiments, have from 3 to 10 ring carbon atoms.

The term "perfluoroalkyl group" includes linear, branched, and/or cyclic alkyl groups in which all C—H bonds are replaced by C—F bonds.

The phrase "interrupted by at least one functional group", for example, with regard to an alkyl, alkylene, or arylalkylene refers to having part of the alkyl, alkylene, or arylalkylene on both sides of the functional group. An example of an alkylene that is interrupted with —O— is —CH$_2$—CH$_2$—O—CH$_2$—CH$_2$—.

The term "aryl" as used herein includes carbocyclic aromatic rings or ring systems, for example, having 1, 2, or 3 rings, optionally containing at least one heteroatom (e.g., O, S, or N) in the ring, and optionally substituted by up to five substituents including one or more alkyl groups having up to 4 carbon atoms (e.g., methyl or ethyl), alkoxy having up to 4 carbon atoms, halo (i.e., fluoro, chloro, bromo or iodo), hydroxy, or nitro groups. Examples of aryl groups include phenyl, naphthyl, biphenyl, fluorenyl as well as furyl, thienyl, oxazolyl, and thiazolyl. "Arylalkylene" refers to an "alkylene" moiety to which an aryl group is attached. "Alkylarylene" refers to an "arylene" moiety to which an alkyl group is attached.

By 'synergist' is meant a compound that allows the use of a lower amount of the silicone-containing polymer or fluoropolymer polymer processing additive while achieving essentially the same improvement in extrusion and processing properties of the extrudable polymer as if a higher amount of the polymer processing additive was used.

It should be understood that the term "polymer processing additive synergist" per se, as used herein, does not include a fluoropolymer or a polyolefin. In other words, a polymer processing additive synergist per se does not include the polymer processing additive or the host polymer. Similarly, a polymer processing additive per se typically would not include a polyolefin or other thermoplastic or host polymer.

All numerical ranges are inclusive of their endpoints and nonintegral values between the endpoints unless otherwise stated.

Various aspects and advantages of embodiments of the present disclosure have been summarized. The above Summary is not intended to describe each illustrated embodiment or every implementation of the present disclosure.

DETAILED DESCRIPTION

The poly(oxyalkylene) polymer whose thermal stability can be enhanced with a metal salt of a carboxylic acid, sulfonic acid, or alkylsulfate can be represented by formula A[(OR$^1$)$_x$OR$^2$]$_y$, wherein A is typically alkylene interrupted by one or more ether linkages, y is 2 or 3, (OR$^1$)$_x$ is a poly(oxyalkylene) chain having a plurality (x) of oxyalkylene groups, OR$^1$, wherein each R$^1$ is independently C$_2$ to C$_5$ alkylene, in some embodiments, C$_2$ to C$_3$ alkylene, x is about 3 to 3000, R$^2$ is hydrogen, alkyl, aryl, arylalkenyl, alkylarylenyl, —C(O)-alkyl, —C(O)-aryl, —C(O)-arylalkenyl, or —C(O)-alkylarylenyl, wherein —C(O)— is bonded to the O of OR$^2$. The variable "x" is selected such that molecular weight of the poly(oxyalkylene) polymer is in a range from about 200 to about 20,000 grams per mole (g/mol) or higher, in some embodiments about 400 to about 15,000 g/mol. In some embodiments, x is in a range from 5 to 1000 or 10 to 500. The poly(oxyalkylene) polymer chain can be a homopolymer chain such as poly (oxyethylene) in which each R$^1$ is —CH$_2$CH$_2$—, or poly(oxypropylene), in which each R$^1$ is —C$_3$H$_6$—. Or the poly(oxyalkylene) polymer chain can be a chain of randomly distributed oxyalkylene groups (e.g., a copolymer —OC$_2$H$_4$— and —OC$_3$H$_6$— units) or having alternating blocks of repeating oxyalkylene groups (e.g., a polymer comprising (—OC$_2$H$_4$—)$_a$ and (—OC$_3$H$_6$—)$_b$ blocks, wherein a+b is in a range from 5 to 5000 or higher, in some embodiments, 10 to 500. In some embodiments, A is ethylene, —CH$_2$—CH(–)—CH$_2$— (derived from glycerol), CH$_3$CH$_2$C(CH$_2$—)$_3$ (derived from 1,1,1-trimethylol propane), poly(oxypropylene), —CH$_2$CH$_2$—O—CH$_2$CH$_2$—, or —CH$_2$CH$_2$—O—CH$_2$CH$_2$—O—CH$_2$CH$_2$—. In some embodiments, R$^2$ is hydrogen, methyl, butyl, phenyl, benzyl, acetyl, benzoyl, or stearyl. Other useful poly(oxyalkylene) polymers are polyesters prepared, for example, from dicarboxylic acids and poly(oxyalkylene) polymers represented by formula A[(OR$^1$)$_x$OR$^2$]$_y$, wherein A, R$^1$, and x are as defined above, R$^2$ is hydrogen, and y is 2. Typically, the major proportion of the poly(oxyalkylene) polymer by weight will be the repeating oxyalkylene groups, (OR$^1$).

In some embodiments, the poly(oxyalkylene) polymers whose thermal stability can be enhanced with a metal salt of a carboxylic acid, sulfonic acid, or alkylsulfate are polyethylene glycols and their derivatives. Polyethylene glycol (PEG) can be represented by formula H(OC$_2$H$_4$)$_x$·OH, where x' is about 15 to 3000. Many of these polyethylene glycols, their ethers, and their esters are commercially available from a variety of sources.

Poly(oxyalkylene) polymers may be selected for their performance as interfacial agents in polymer processing additive blends. The (oxyalkylene) polymer may be selected such that it (1) is in the liquid state (or molten) at a desired extrusion temperature; (2) has a lower melt viscosity than both the host polymer and the polymer processing additive; and (3) freely wets the surface of the polymer processing additive particles in extrudable compositions.

In a polymer processing additive synergist disclosed herein, a mixture of two or more different poly(oxylalkylene) polymers may be useful, or the poly(oxyalkylene) polymer can be used in combination with other types of synergists such as silicone-polyether copolymers; aliphatic polyesters such as poly(butylene adipate), poly (lactic acid) and polycaprolactone polyesters; and aromatic polyesters such as phthalic acid diisobutyl ester.

The metal salt of a carboxylic acid, sulfonic acid, or alkylsulfate is useful for thermally stabilizing a poly(oxyalkylene) polymer in compositions and methods according to the present disclosure. In some embodiments, the metal salt is a metal salt of a carboxylic acid or a sulfonic acid. Carboxylic acids and sulfonic acids may be monofunctional or multifunctional (e.g., difunctional) and may be aliphatic or aromatic. In other words, the carbonyl carbon or sulfonyl sulfur may be attached to an aliphatic group or aromatic ring. Aliphatic carboxylic acids and sulfonic acids may be saturated or unsaturated. In addition to the one or more —C(O)O$^-$ or —S(O)$_2$O$^-$ anions (i.e., carboxylate or sulfonate groups, respectively), the aliphatic or aromatic group may also be substituted by other functional groups including halogen (i.e., fluoro, chloro, bromo, and iodo), hydroxyl, and alkoxy groups, and aromatic rings may also be substituted by alkyl groups. In some embodiments, the carboxylic acid or sulfonic acid is monofunctional or difunctional and aliphatic, without any further substituents on the aliphatic chain.

In some embodiments, the metal salt is a metal salt of a carboxylic acid. In some embodiments, the carboxylic acid useful for providing the metal salt is represented by formula RCOOH, wherein R is alkyl or alkenyl. In some embodiments, the carboxylic acid is acetic acid. In some embodiments, the carboxylic acid is a fatty acid, for example, having an alkyl or alkenyl group with about 8 to 30 (in some embodiments, 8 to 26 or 8 to 22) carbon atoms. The common names of the fatty acids having from eight to twenty six carbon atoms are caprylic acid (C$_8$), capric acid (C$_{10}$), lauric acid (C$_{12}$), myristic acid (C$_{14}$), palmitic acid (C$_{16}$), stearic acid (C$_{18}$), arachidic acid (C$_{20}$), behenic acid (C$_{22}$), lignoceric acid (C$_{24}$), and cerotic acid (C$_{26}$). Fatty acid metal salts of these acids may be caprylate, caprate, laurate, myristate, palmitate, stearate, arachidate, behenate, lignocerate, and cerotate salts, in some embodiments. In some embodiments the carboxylic acid is other than stearic acid.

In some embodiments, the metal salt is a metal salt of a sulfonic acid. In some embodiments, the sulfonic acid useful for providing the metal salt is represented by formula RS(O)$_2$OH, wherein R is alkyl or alkenyl. The alkyl or alkenyl group has about 8 to 30 (in some embodiments, 8 to 26 or 8 to 22) carbon atoms.

In some embodiments, the metal salt is a metal salt of an alkyl sulfate. In addition to the one or more —OS(O)$_2$θO— anions (i.e., sulfate groups), the alkyl group may also be substituted by other functional groups including halogen (i.e., fluoro, chloro, bromo, and iodo), hydroxyl, and alkoxy groups. In some embodiments, the alkyl group includes no further substitution. The acid useful for providing the metal salt is typically represented by formula R'OS(O)$_2$OH, wherein R' is alkyl having about 8 to 30 (in some embodiments, 8 to 26 or 8 to 22) carbon atoms.

Examples of useful metal cations in the metal salt of a carboxylic acid, sulfonic acid, or alkylsulfate include aluminum (Al), calcium (Ca), magnesium (Mg), zinc (Zn), barium (Ba), lithium (Li), sodium (Na), and potassium (K). In some embodiments, the metal salt is a sodium or potassium salt. In some embodiments, the metal salt is a zinc or calcium salt.

Many metal salts of a carboxylic acid, sulfonic acid, or alkylsulfate are available from a variety of commercial sources, and others can be made by conventional methods. In some embodiments, the metal salt of a carboxylic acid, sulfonic acid, or alkylsulfate can be formed in situ. In these embodiments, typically a first component containing the metal cation and a second component containing the a carboxylic acid, sulfonic acid, or alkylsulfate can both be added to a polymer processing additive synergist composition or a composition including an extrudable polymer. For example, zinc oxide and stearic acid may be added to a composition to form zinc stearate.

Examples of metal salts of a carboxylic acid, sulfonic acid, or alkylsulfate useful for thermally stabilizing a poly (oxyalkylene) polymer in compositions and methods according to the present disclosure include calcium stearate, zinc stearate, barium stearate, aluminum stearate, potassium stearate, magnesium stearate, sodium stearate, zinc acetate, sodium acetate, sodium caprylate, sodium laurate, sodium behenate, sodium 1-decane sulfonate, sodium lauryl sulfate, and zinc phthalate. In some embodiments, the metal salt is other than calcium stearate or zinc stearate. In some embodiments, the metal salt is other than calcium stearate.

In a polymer processing additive synergist useful for practicing the present disclosure comprising a poly(oxyalkylene) polymer and a metal salt of a carboxylic acid, sulfonic acid, or alkylsulfate, the poly(oxyalkylene) polymer can be present in an amount of at least 85% by weight, based on the total weight of the poly(oxyalkylene) polymer and the metal salt. In some embodiments, the poly(oxyalkylene) polymer is present in an amount of at least 85%, 90%, 95%, or 97.5% by weight, based on the total weight of the poly(oxyalkylene) polymer and the metal salt. In some embodiments, metal salt is present in an amount of up to 15%, 10%, 5%, or 2.5% by weight based on the total weight of the poly(oxyalkylene) polymer and the metal salt. In some embodiments, the metal salt can improve the thermal stability of the poly(oxyalkylene) polymer even when it is present in amounts up to 1% or 0.5% by weight, based on the total weight of the poly(oxyalkylene) polymer and the metal salt.

The poly(oxyalkylene) polymer stabilized with a metal salt of a carboxylic acid, sulfonic acid, or alkylsulfate is useful, for example, as a synergist in a polymer processing additive composition. The polymer processing additive may be a fluoropolymer or a silicone-containing polymer. It may be useful in the preparation of a polymer processing additive composition, in some embodiments, to combine the poly (oxyalkylene) polymer with a metal salt of a carboxylic acid, sulfonic acid, or alkylsulfate before combining the resulting synergist with a silicone-containing polymer or fluoropolymer polymer processing additive.

Fluoropolymers useful as polymer processing additives, which may be included in compositions and methods according to the present disclosure, include amorphous fluoropolymers and semi-crystalline fluoropolymers. In some embodiments, fluoropolymers useful as polymer processing additives can be described as being in the fluid state at room temperature and above. Such fluoropolymers have glass transition temperatures below room temperature and exhibit little or no crystallinity at room temperature and above.

Fluoropolymers useful as polymer processing additives include homopolymers and/or copolymers of fluorinated olefins. In some embodiments, the homopolymers or copolymers can have a fluorine atom-to-carbon atom ratio of at least 1:2, in some embodiments at least 1:1; and/or a fluorine atom-to-hydrogen atom ratio of at least 1:1.5.

Fluoropolymers useful as polymer processing additives can comprise interpolymerized units derived from at least one partially fluorinated or perfluorinated ethylenically unsaturated monomer represented by formula $R^aCF=CR^a_2$, wherein each $R^a$ is independently fluoro, chloro, bromo, hydrogen, a fluoroalkyl group (e.g. perfluoroalkyl having from 1 to 8, 1 to 4, or 1 to 3 carbon atoms), a fluoroalkoxy group (e.g. perfluoroalkoxy having from 1 to 8, 1 to 4, or 1 to 3 carbon atoms), alkyl or alkoxy of from 1 to 8 carbon atoms, aryl of from 1 to 8 carbon atoms, or cyclic saturated alkyl of from 1 to 10 carbon atoms. Examples of useful fluorinated monomers represented by formula $R^aCF=CR^a_2$ include vinylidene fluoride, tetrafluoroethylene, hexafluoropropylene, chlorotrifluoroethylene, 2-chloropentafluoropropene, dichlorodifluoroethylene, 1,1-dichlorofluoroethylene, and mixtures thereof.

The fluoropolymer useful as a polymer processing additive may also comprise interpolymerized units derived from the interpolymerization of at least one monomer $R^aCF=CR^a_2$ with at least one non-fluorinated, copolymerizable comonomer represented by formula $R^b_2C=CR^b_2$, wherein each $R^b$ is independently hydrogen, chloro, alkyl having from 1 to 8, 1 to 4, or 1 to 3 carbon atoms, a cyclic saturated alkyl group having from 1 to 10, 1 to 8, or 1 to 4 carbon atoms, or an aryl group of from 1 to 8 carbon atoms. Examples of useful monomers represented by formula $R^b_2C=CR^b_2$ include ethylene and propylene.

Perfluoro-1,3-dioxoles may also be useful to prepare the fluorinated polymer processing additive disclosed herein. Perfluoro-1,3-dioxole monomers and their copolymers are described in U.S. Pat. No. 4,558,141 (Squires).

In some embodiments, fluoropolymers useful as polymer processing additives in the methods and compositions of the present disclosure are homopolymers derived, for example, from vinylidene fluoride and vinyl fluoride. In some embodiments, fluorinated copolymers useful as polymer processing additives comprise interpolymerized units of vinylidene fluoride. Examples of copolymers of fluorinated olefins that can be used are those derived, for example, from vinylidene fluoride, and one or more additional olefins, which may or may not be fluorinated (e.g., represented by formula $R^aCF=CR^a_2$ or $R^b_2C=CR^b_2$). In some embodiments, useful fluoropolymers include copolymers of vinylidene fluoride with at least one terminally unsaturated fluoromonoolefin represented by formula $R^aCF=CR^a_2$ containing at least one fluorine atom on each double-bonded carbon atom. Examples of comonomers that can be useful with vinylidene fluoride include perfluoropropylene, tetrafluoroethylene, chlorotrifluoroethylene, and pentafluoropropylene. In some embodiments, fluoropolymers polymerized from vinylidene fluoride, hexafluoropropylene, chlorotrifluoroethylene, tetrafluoroethylene, perfluoroalkyl perfluorovinyl ethers, or combinations thereof can be utilized. Specific examples of the amorphous fluoropolymers which may be employed include copolymers of vinylidene fluoride and a comonomer selected from hexafluoropropylene, chlorotrifluoroethylene, 1-hydropentafluoropropylene, and 2-hydropentafluoropropylene; copolymers of vinylidene fluoride, tetrafluoroethylene, and hexafluoropropylene or 1- or 2-hydropentafluoropropylene; and copolymers of tetrafluoroethylene, propylene and, optionally, vinylidene fluoride. In some embodiments, the fluoropolymer polymer processing additive is a copolymer of hexafluoropropylene and vinylidene fluoride. Such fluoropolymers are described in U.S. Pat. No. 3,051,677 (Rexford) and U.S. Pat. No. 3,318,854 (Honn, et al.) for example. In some embodiments, the fluoropolymer polymer processing additive is a copolymer of perfluoropropylene, vinylidene fluoride and tetrafluoroethylene. Such fluoropolymers are described in U.S. Pat. No. 2,968,649 (Pailthorp et al.), for example.

In some embodiments, fluorinated copolymers useful as polymer processing additives in the compositions and methods disclosed herein comprise interpolymerized units of tetrafluoroethylene. In some of these embodiments, the useful copolymers comprise at least 5 weight % of at least one copolymerizable comonomer other than tetrafluoroethylene. This latter class of fluoropolymers includes copolymers of interpolymerized units derived from tetrafluoroethylene and hexafluoropropylene; copolymers of interpolymerized units derived from tetrafluoroethylene, hexafluoropropylene, and vinylidene fluoride; copolymers of interpolymerized units derived from tetrafluoroethylene, hexafluoropropylene, and a monomer represented by formula $R^b_2C=CR^b_2$ in any of its embodiments described above; and copolymers derived from interpolymerized units derived from tetrafluoroethylene and a monomer represented by formula $R^b_2C=CR^b_2$ in any of its embodiments described above.

Some fluoropolymers useful as polymer processing additives are commercially available. For example, copolymers of hexafluoropropylene and vinylidene fluoride are commercially available from 3M Company, St. Paul, Minn., under the trade designations as "DYNAMAR FX 9613" and "DYNAMAR FX 9614", and copolymers of vinylidene fluoride, tetrafluoroethylene, and hexafluoropropylene are commercially available from 3M Company under the trade designations "DYNAMAR FX 5911", and "DYNAMAR FX 5912". Other useful fluoropolymers are commercially available from E.I. duPont de Nemours and Co., Wilmington, Del., under the trade designations "VITON A" and "VITON FREEFLOW" in various grades and from Daikin Industries, Ltd., Osaka, Japan, under the trade designation "DAI-EL" in various grades, and from Arkema, Colombes, France, under the trade designation "KYNAR" in various grades.

Semi-crystalline fluoropolymers which may be useful as polymer processing additives in the compositions and methods disclosed herein include poly(vinylidene fluoride), homopolymers and copolymers of tetrafluoroethylene (such as fluorinated resin commercially available from E.I. duPont de Nemours and Co., under the trade designation "TEFLON FEP RESIN", and copolymers of tetrafluoroethylene, propylene and, optionally, vinylidene fluoride). Multimodal fluoropolymers, such as those disclosed in U.S. Pat. No. 6,277,919 (Dillon et al.), may also be useful as polymer processing additives. "Multimodal" as used herein means that the fluoropolymer has at least two components of discrete and different molecular weights. Both components may be amorphous or semi-crystalline, or one component may be amorphous and another component semi-crystalline.

U.S. Pat. No. 7,375,157 (Amos et al.) describes that fluoropolymers containing long-chain branches are suitable as polymer processing additives. Accordingly, in some embodiments, compositions and methods according to the present disclosure include fluoropolymer polymer processing additives with long-chain branching. Such fluoropolymers are prepared by using modifiers such as bisolefins or halogen containing monoolefins during the polymerization reaction. Examples of halogen-containing monoolefins include those represented by formula $CX_2=CX(Z)$, wherein each X is independently hydrogen or fluoro, and Z is iodo, bromo, or $R_f$—Z, wherein Z is iodo or bromo and $R_f$ is a perfluorinated or partially perfluorinated alkylene group optionally containing O atoms. In addition, non-fluorinated bromo- or iodo-substituted olefins, e.g., vinyl iodide and allyl iodide, can be used. In some embodiments, the halogen containing monoolefin is $CH_2=CHI$, $CF_2=CHI$, $CF_2=CFI$, $CH_2=CHCH_2I$, $CF_2=CFCF_2I$, $CH_2=CHCF_2CF_2I$, $CF_2=CFCH_2CH_2I$, $CF_2=CFCF_2CF_2I$, $CH_2=CH(CF_2)_6CH_2CH_2I$, $CF_2=CFOCF_2CF_2I$, $CF_2=CFOCF_2CF_2CF_2I$, $CF_2=CFOCF_2CF_2CH_2I$, $CF_2=CFCF_2OCH_2CH_2I$, $CF_2=CFO(CF_2)_3OCF_2CF_2I$, $CH_2=CHBr$, $CF_2=CHBr$, $CF_2=CFBr$, $CH_2=CHCH_2Br$, $CF_2=CFCF_2Br$, $CH_2=CHCF_2CF_2Br$, $CF_2=CFOCF_2CF_2Br$, $CF_2=CFCl$, $CF_2=CFCF_2Cl$, or a mixture thereof.

U.S. Pat. Appl. Pub. No. 2010/0311906 (Lavellee et al.) describes certain bisolefins useful for achieving long-chain branching in fluoropolymers. Such modifiers are fluorinated, in some embodiments, perfluorinated, bisolefinic ethers selected from diallyl ethers, divinyl ethers and allylvinyl ethers, which may be represented by formula $CR^5R^6=CF—O—Rf_1—O—CF=CR^3R^4$, $CR^5R^6=CF—CF_2—O—Rf_1—O—CF_2—CF=CR^3R^4$, or $CR^5R^6=CF—CF_2—O—Rf_1—O—CF=CR^3R^4$. In these formulas, $R^3$, $R^4$, $R^5$, and $R^6$ are each independently fluoro, hydrogen, alkyl, alkoxy, polyoxyalkyl, perfluoroalkyl, perfluoroalkoxy or perfluoropolyoxyalkyl. In some embodiments, $R^3$, $R^4$, $R^5$, and $R^6$ are each independently fluoro, $CF_3$, $C_2F_5$, $C_3F_7$, $C_4F_9$, hydrogen, $CH_3$, $C_2H_5$, $C_3H_7$, $C_4H_9$. In some embodiments, $R^3$, $R^4$, $R^5$, and $R^6$ are each fluoro. $Rf_1$ represents linear or branched perfluoroalkylene or perfluoropolyoxyalkylene or arylene, which may be non-fluorinated or fluorinated. In some embodiments, $Rf_1$ is perfluoroalkylene having from 1 to 12, from 2 to 10, or from 3 to 8 carbon atoms. The arylene may have from 1 to 14, 1 to 12, or 1 to 10 carbon atoms and may be non-substituted or substituted with one or more halogens other than fluoro, perfluoroalkyl (e.g. —$CF_3$ and —$CF_2CF_3$), perfluoroalkoxy (e.g. —O—$CF_3$, —$OCF_2CF_3$), perfluoropolyoxyalkyl (e.g., —$OCF_2OCF_3$; —$CF_2OCF_2OCF_3$), fluorinated, perfluorinated, or non-fluorinated phenyl or phenoxy, which may be substituted with one or more perfluoroalkyl, perfluoroalkoxy, perfluoropolyoxyalkyl groups, one or more halogens other than fluoro, or combinations thereof.

Examples of bisolefinic ethers include those represented by formulas $CF_2=CF—O—Rf_1—O—CF=CF_2$ and $CF_2=CF—CF_2—O—Rf_1—O—CF_2—CF=CF_2$. In some embodiments, $Rf_1$ is $CF_2$; $(CF_2)_n$ wherein n is 2, 3, 4, 5, 6, 7 or 8; $CF_2—O—CF_2$; $CF_2—O—CF_2—CF_2$; $CF(CF_3)$; $(CF_2)_2—O—CF(CF_3)—CF_2$; $CF(CF_3)—CF_2—O—CF(CF_3)$; or $(CF_2)_2—O—CF(CF_3)—CF_2—O—CF(CF_3)—CF_2—O—CF_2$. In some embodiments, $Rf_1$ is phenylene or mono-, di-, tri- or tetrafluoro-phenylene, with the ether groups linked in the ortho, para or meta configuration.

The bisolefin modifiers may be prepared using a variety of methods, for example, those described in U.S. Pat. No. 4,273,728 (Krespan), U.S. Pat. No. 3,326,984 (Anderson et al.), and U.S. Pat. No. 6,300,526 (Navarrini et al). Some are commercially available from Anles, St. Petersburg, Russia.

The level of branching or non-linearity in a fluoropolymer having long-chain branching can be characterized through the long chain branching index (LCBI). The LCBI can be determined as described in R. N. Shroff, H. Mavridis; Macromol., 32, 8464-8464 (1999) & 34, 7362-7367 (2001) according to the equation:

$$LCBI = \frac{\eta_{0,br.}^{1/a}}{[\eta]_{br.}} \cdot \frac{1}{k^{1/a}} - 1 \qquad \text{eq. 1}$$

In the above equation, $\eta 0,br$ is the zero shear viscosity (units Pa*s) of the branched fluoropolymer measured at a temperature T, $[\eta]br$ is the intrinsic viscosity (units mL/g) of the branched fluoropolymer at a temperature T' in a solvent in which the branched fluoropolymer can be dissolved, and a and k are constants. These constants are determined from the following equation:

$$\eta_{0,lin} = k \cdot [\eta]_{lin}^{a}. \qquad \text{eq. 2}$$

wherein $\eta 0,lin$ and $[\eta]lin$ represent respectively the zero shear viscosity and intrinsic viscosity of the corresponding linear fluoropolymer measured at the respective same temperatures T and T' and in the same solvent. Thus, the LCBI is independent of the selection of the measurement temperatures and solvent chosen, provided that the same solvent and temperatures are used in equations 1 and 2. In some embodiments in which the fluoropolymer has long-chain branching, the LCBI of the fluoropolymer may be at least about 0.2, at least about 0.3, or at least about 0.4. The LCBI may be less than about 5, less than about 2.0, or less than about 1.0. Generally, the LCBI may be from about 0.2 up to about 5, in some embodiments from about 0.2 to about 2.0.

Generally, the effectiveness of the fluoropolymer to decrease melt defects will increase with increasing value of the LCBI for polymers having similar zero shear rate viscosities. However, when the level of branching (and thus the LCBI value) becomes too large, the fluoropolymer may have a gel fraction that cannot be dissolved in an organic solvent. At such high levels of branching, the advantageous effects of the fluoropolymer on the processing of the melt-processable polymer composition may be reduced as the melt viscosity of the fluoropolymer may be too high.

The modifiers described above should generally be used at fairly low levels to avoid too much branching to occur during the polymerization. The amount of modifier that is typically used in the polymerization to cause a desired amount of branching of the fluoropolymer depends on the nature of the modifier used and on the polymerization conditions such as reaction time and temperature. The amount of modifier to be used is selected such that the desired LCBI value is attained. The optimal amount of modifier can be readily determined by one skilled in the art but is generally not more than 1% by weight and for example not more than 0.7% or 0.5% by weight based on the total weight of monomers fed to the polymerization. A useful amount may be from about 0.01% to 1% by weight, conveniently from about 0.02 to 0.5% by weight, from about 0.01 to 0.3% by weight, or from about 0.05% to 0.25% by weight. The modifier can be added at the start of the polymerization and/or may be added during the polymerization in a continuous way or portion-wise. In some embodiments, the modifier is continuously fed to the polymerization.

Fluoropolymers useful as polymer processing additives, which may be useful in the compositions and methods according to the present disclosure, can have a variety of Mooney viscosities. For example, Mooney viscosities ML 1+10@121° C. of from 30 to 150, 30 to 120, 30 to 110, or 30 to 90 may be useful. In some embodiments, the Mooney viscosity ML 1+10@121° C. of the fluoropolymer is in a range from about 30 to about 60. In some embodiments, the Mooney viscosity ML 1+10@121° C. of the fluoropolymer is in a range from about 30 to less than 60, for example 59, 58, 55 or 50. In some embodiments, the Mooney viscosity ML 1+10@121° C. of the fluoropolymer is in a range from about 40 to about 58, about 40 to about 55, or about 43 to about 53. In some embodiments, the Mooney viscosity ML 1+10@121° C. of the fluoropolymer is in a range from about 60 to about 90, about 60 to about 80, or about 65 about 75. Mooney viscosities can be controlled, for example, by controlling molecular weight and branching in the fluoropolymer. Fluoropolymers with long-chain branching having Mooney viscosities ML 1+10@121° C. in a range from about 60 to about 90 effectively reduce melt fracture during extrusion and tend to be dispersed better in extrudable polymers than fluoropolymers having similar Mooney viscosities and a linear chain topography. Mooney viscosity is determined using ASTM D1646-06 Part A by a MV 2000 instrument (available from Alpha Technologies, Ohio, USA) using a large rotor (ML 1+10) at 121° C. Mooney viscosities specified above are in Mooney units.

Fluoropolymers useful as polymer processing additives, including those described in any of the above embodiments, are typically prepared by a sequence of steps, which can include polymerization, coagulation, washing, and drying. In some embodiments, an aqueous emulsion polymerization can be carried out continuously under steady-state conditions. For example, an aqueous emulsion of monomers (e.g., including any of those described above), water, emulsifiers, buffers and catalysts can be fed continuously to a stirred reactor under optimum pressure and temperature conditions while the resulting emulsion or suspension is continuously removed. In some embodiments, batch or semibatch polymerization is conducted by feeding the aforementioned ingredients into a stirred reactor and allowing them to react at a set temperature for a specified length of time or by charging ingredients into the reactor and feeding the monomers into the reactor to maintain a constant pressure until a desired amount of polymer is formed. After polymerization, unreacted monomers are removed from the reactor effluent latex by vaporization at reduced pressure. The amorphous fluoropolymer can be recovered from the latex by coagulation.

The polymerization is generally conducted in the presence of a free radical initiator system, such as ammonium persulfate, potassium permanganate, AIBN, or bis(perfluoroacyl) peroxides. The polymerization reaction may further include other components such as chain transfer agents and complexing agents. The polymerization is generally carried out at a temperature in a range from 10° C. and 100° C., or in a range from 30° C. and 80° C. The polymerization pressure is usually in the range of 0.3 MPa to 30 MPa, and in some embodiments in the range of 2 MPa and 20 MPa.

When conducting emulsion polymerization, perfluorinated or partially fluorinated emulsifiers may be useful. Generally these fluorinated emulsifiers are present in a range from about 0.02% to about 3% by weight with respect to the polymer. Polymer particles produced with a fluorinated emulsifier typically have an average diameter, as determined by dynamic light scattering techniques, in range of about 10 nanometers (nm) to about 300 nm, and in some embodiments in range of about 50 nm to about 200 nm. If desired, the emulsifiers can be removed or recycled from the fluoropolymer latex as described in U.S. Pat. No. 5,442,097 to Obermeier et al., U.S. Pat. No. 6,613,941 to Felix et al., U.S. Pat. No. 6,794,550 to Hintzer et al., U.S. Pat. No. 6,706,193 to Burkard et al. and U.S. Pat. No. 7,018,541 Hintzer et al. In some embodiments, the polymerization process may be conducted with no emulsifier (e.g., no fluorinated emulsifier). Polymer particles produced without an emulsifier typically have an average diameter, as determined by dynamic light scattering techniques, in a range of about 40 nm to about 500 nm, typically in range of about 100 nm and about 400 nm, and suspension polymerization will typically produce particles sizes up to several millimeters.

In some embodiments, a water soluble initiator can be useful to start the polymerization process. Salts of peroxy sulfuric acid, such as ammonium persulfate, are typically applied either alone or sometimes in the presence of a reducing agent, such as bisulfites or sulfinates (disclosed in U.S. Pat. Nos. 5,285,002 and 5,378,782 both to Grootaert) or the sodium salt of hydroxy methane sulfinic acid (sold under the trade designation "RONGALIT", BASF Chemical Company, New Jersey, USA). Most of these initiators and the emulsifiers have an optimum pH-range where they show most efficiency. For this reason, buffers are sometimes useful. Buffers include phosphate, acetate or carbonate buffers or any other acid or base, such as ammonia or alkali metal hydroxides. The concentration range for the initiators and buffers can vary from 0.01% to 5% by weight based on the aqueous polymerization medium. If desired, such as for improved processing, the presence of strong polar end groups such as $SO_3^{(-)}$ and $COO^{(-)}$ can be reduced through known post treatments (e.g., decarboxylation, post-fluorination). Chain transfer agents of any kind can significantly reduce the number of ionic or polar end groups.

Chain transfer agents and any long-chain branching modifiers described above can be fed into the reactor by batch charge or continuously feeding. Because feed amount of chain transfer agent and/or long-chain branching modifier is relatively small compared to the monomer feeds, continuous feeding of small amounts of chain transfer agent and/or long-chain branching modifier into the reactor can be achieved by blending the long-chain branding modifier or chain transfer agent in one or more monomers.

Adjusting, for example, the concentration and activity of the initiator, the concentration of each of the reactive monomers, the temperature, the concentration of the chain transfer agent, and the solvent using techniques known in the art can control the molecular weight of the amorphous fluoropolymer. In some embodiments, fluoropolymers useful for practicing the present disclosure have weight average molecular weights in a range from 10,000 g/mol to 200,000 g/mol. In some embodiments, the weight average molecular weight is at least 15,000, 20,000, 25,000, 30,000, 40,000, or 50,000 g/mol up to 100,000, 150,000, 160,000, 170,000, 180,000, or up to 190,000 g/mol. Fluoropolymers useful for practicing the present disclosure typically have a distribution of molecular weights and compositions. Weight average molecular weights can be measured, for example, by gel permeation chromatography (i.e., size exclusion chromatography) using techniques known to one of skill in the art.

To coagulate the obtained fluoropolymer latex, any coagulant which is commonly used for coagulation of a fluoropolymer latex may be used, and it may, for example, be a water soluble salt (e.g., calcium chloride, magnesium chloride, aluminum chloride or aluminum nitrate), an acid (e.g., nitric acid, hydrochloric acid or sulfuric acid), or a water-soluble organic liquid (e.g., alcohol or acetone). The amount of the coagulant to be added may be in range of 0.001 to 20 parts by mass, for example, in a range of 0.01 to 10 parts by mass per 100 parts by mass of the fluoropolymer latex. Alternatively or additionally, the fluoropolymer latex may be frozen for coagulation. The coagulated fluoropolymer can be collected by filtration and washed with water. The washing water may, for example, be ion exchanged water, pure water or ultrapure water. The amount of the washing water may be from 1 to 5 times by mass to the fluoropolymer, whereby the amount of the emulsifier attached to the fluoropolymer can be sufficiently reduced by one washing.

The fluoropolymers useful as polymer processing additives may include a blend of fluoropolymers. Two or more different fluoropolymers each having interpolymerized units described in any of the above embodiments may be useful.

The poly(oxyalkylene) polymer stabilized with a metal salt of a carboxylic acid, sulfonic acid, or alkylsulfate is also useful, for example, as a synergist in a polymer processing additive composition in which the polymer processing additive is a silicone-containing polymer. Various silicone-containing polymer processing additives may be useful in the compositions and methods according to the present disclosure, for example, polydiorganosiloxane polyamide polymers and silicone-polyurethane polymers. Such silicone-containing polymer processing additives may be thermoplastic.

Thermoplastic silicone-containing polymer process additive components useful for practicing the present disclosure may have a molecular weight greater than 25,000 g/mol, greater than 50,000 g/mol, or greater than 100,000 g/mol. In some embodiments, the silicone-containing polymer processing additive is a linear polydiorganosiloxane, a linear polydiorganosiloxane polyamide block copolymer or a polydiorganosiloxane urethane-containing copolymer, but other silicone-containing polymer processing additives may be useful. Useful silicone-containing polymer processing additives are typically "hot melt processable", which means they melt and flow at elevated temperatures above room temperature.

A polydiorganosiloxane can have a variety of organic substituents on the silicon carbon atoms of the polysiloxane. For example, each organic substituent can be independently an alkyl, haloalkyl, arylalkylenyl, alkylarylenyl, alkenyl, aryl, or aryl substituted with an alkyl, alkoxy, or halo. The polydiorganosiloxane may have repeating units of the general formula $(Si(R^7)_2O{-}{-})$ wherein $R^7$ is as defined below for any of the embodiments of $R^7$ in Formula I. Examples include dimethylsilicones, diethylsilicones, and diphenylsilicones. In some embodiments, at least 40 percent, and in some embodiments at least 50 percent, at least 60 percent, at least 70 percent, at least 80 percent, at least 90 percent, at least 95 percent, at least 98 percent, or at least 99 percent of the $R^7$ groups can be phenyl, methyl, or combinations thereof. In some embodiments, at least 40 percent, at least 50 percent, at least 60 percent, at least 70 percent, at least 80 percent, at least 90 percent, at least 95 percent, at least 98 percent, or at least 99 percent of the $R^7$ groups are methyl. High molecular weight polydimethylsiloxane (PDMS) is commercially available, for example, from Dow Corning Corporation, Midland, Mich.

A linear, polydiorganosiloxane polyamide block copolymer useful for practicing the present disclosure contains at least two repeat units of Formula I:

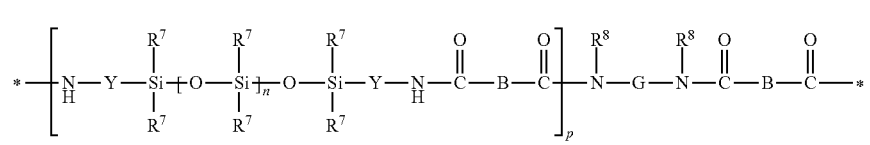

In this formula, each $R^7$ is independently an alkyl, haloalkyl, arylalkylenyl, alkylarylenyl, alkenyl, aryl, or aryl substituted with an alkyl, alkoxy, or halo. Each Y is independently an alkylene, arylalkylene, alkylarylene, or a combination thereof. Subscript n is independently in a range from 0 to 1500 and subscript p is in a range from 1 to 10. Each group B is independently a covalent bond, an alkylene, an arylalkylene, an alkylarylene, an arylene, or a combination thereof. When each group B is a covalent bond, the polydiorganosiloxane polyamide block copolymer of Formula I is referred to as a polydiorganosiloxane polyoxamide block copolymer.

Group G is a divalent group that is the residue unit that is equal to a diamine of formula $R^8HN{-}G{-}NHR^8$ minus the two $-NHR^8$ groups. Group $R^8$ is hydrogen or alkyl (e.g., an alkyl having 1 to 10, 1 to 6, or 1 to 4 carbon atoms) or $R^8$ taken together with G and with the nitrogen to which they are both attached forms a heterocyclic group. Each asterisk (*) indicates a site of attachment of the repeat unit to another group in the copolymer such as, for example, another repeat unit of Formula I.

Suitable alkyl groups for $R^7$ in Formula I typically have 1 to 10, 1 to 6, or 1 to 4 carbon atoms. Examples of useful alkyl groups include methyl, ethyl, isopropyl, n-propyl, n-butyl, and iso-butyl. Suitable haloalkyl groups for $R^7$ often have only a portion of the hydrogen atoms of the corresponding alkyl group replaced with a halogen. Examples of haloalkyl groups include chloroalkyl and fluoroalkyl groups with 1 to 3 halo atoms and 3 to 10 carbon atoms. Suitable alkenyl groups for $R^7$ often have 2 to 10 carbon atoms.

Examples of alkenyl groups often have 2 to 8, 2 to 6, or 2 to 4 carbon atoms such as ethenyl, n-propenyl, and n-butenyl. Suitable aryl groups for $R^7$ often have 6 to 12 carbon atoms. Phenyl is an example of an aryl group. The aryl group can be unsubstituted or substituted with an alkyl (i.e., it may be an alkylarylenyl group) (the alkyl group may be, e.g., an alkyl having 1 to 10 carbon atoms, 1 to 6 carbon atoms, or 1 to 4 carbon atoms), an alkoxy (e.g., an alkoxy having 1 to 10 carbon atoms, 1 to 6 carbon atoms, or 1 to 4 carbon atoms), or halo (e.g., chloro, bromo, or fluoro). Suitable arylalkylenyl and alkylarylenyl groups for $R^7$ usually have an alkylene group with 1 to 10 carbon atoms and an aryl group with 6 to 12 carbon atoms. In some arylalkylenyl and alkylarylenyl groups, the aryl group is phenyl and the alkylene group has 1 to 10 carbon atoms, 1 to 6 carbon atoms, or 1 to 4 carbon atoms. For example, $R^7$ may be an arylalkylenyl group where any of these alkylene groups is bonded to a phenyl group.

In some embodiments, in some repeat units of Formula I, at least 40 percent, and in some embodiments at least 50 percent, of the $R^7$ groups are phenyl, methyl, or combinations thereof. For example, at least 60 percent, at least 70 percent, at least 80 percent, at least 90 percent, at least 95 percent, at least 98 percent, or at least 99 percent of the $R^7$ groups can be phenyl, methyl, or combinations thereof. In some embodiments, in some repeat units of Formula I, at least 40 percent, and in some embodiments at least 50 percent, of the $R^7$ groups are methyl. For example, at least 60 percent, at least 70 percent, at least 80 percent, at least 90 percent, at least 95 percent, at least 98 percent, or at least 99 percent of the $R^7$ groups can be methyl. The remaining $R^7$ groups can be selected from an alkyl having at least two carbon atoms, haloalkyl, arylalkylenyl, alkylarylenyl, alkenyl, aryl, or aryl substituted with an alkyl, alkoxy, or halo.

Each Y in Formula I is independently an alkylene, arylalkylene, alkylarylene, or a combination thereof. Suitable alkylene groups typically have up to 10 carbon atoms, up to 8 carbon atoms, up to 6 carbon atoms, or up to 4 carbon atoms. Examples of alkylene groups include methylene, ethylene, propylene, butylene, and the like. Suitable arylalkylene and alkylarylene groups usually have an arylene group with 6 to 12 carbon atoms bonded to an alkylene group with 1 to 10 carbon atoms. In some arylalkylene and alkylarylene groups, the arylene portion is phenylene. That is, the divalent arylalkylene or alkylarylene group has phenylene bonded to an alkylene having 1 to 10, 1 to 8, 1 to 6, or 1 to 4 carbon atoms. As used herein with reference to group Y, "a combination thereof" refers to a combination of two or more groups selected from an alkylene and arylalkylene or alkylarylene group. A combination can be, for example, a single alkylarylene bonded to a single alkylene (e.g., alkylene-arylene-alkylene). In one example of an alkylene-arylene-alkylene combination, the arylene is phenylene and each alkylene has 1 to 10, 1 to 6, or 1 to 4 carbon atoms.

Each subscript n in Formula I is independently in a range from 0 to 1500. For example, subscript n can be up to 1000, up to 500, up to 400, up to 300, up to 200, up to 100, up to 80, up to 60, up to 40, up to 20, or up to 10. The value of n is often at least 1, at least 2, at least 3, at least 5, at least 10, at least 20, or at least 40. For example, subscript n can be in the range of 40 to 1500, 0 to 1000, 40 to 1000, 0 to 500, 1 to 500, 40 to 500, 1 to 400, 1 to 300, 1 to 200, 1 to 100, 1 to 80, 1 to 40, or 1 to 20.

The subscript p is in a range from 1 to 10. For example, the value of p is often an integer up to 9, up to 8, up to 7, up to 6, up to 5, up to 4, up to 3, or up to 2. The value of p can be in the range of 1 to 8, 1 to 6, or 1 to 4.

Group G in Formula I is a residual unit that is equal to a diamine compound of formula $R^8HN\text{-}G\text{-}NHR^8$ minus the two amino groups (i.e., $-NHR^8$ groups). The diamine can have primary or secondary amino groups. Group $R^8$ is hydrogen or alkyl (e.g., an alkyl having 1 to 10, 1 to 6, or 1 to 4 carbon atoms) or $R^8$ taken together with G and with the nitrogen to which they are both attached forms a heterocyclic group (e.g., a 5- to 7-membered ring). In some embodiments, $R^8HN\text{-}G\text{-}NHR^8$ is piperazine. In some embodiments, $R^8$ is hydrogen or an alkyl. In some embodiments, both of the amino groups of the diamine are primary amino groups (i.e., both $R^8$ groups are hydrogen) and the diamine is represented by formula $H_2N\text{-}G\text{-}NH_2$.

In some embodiments, G is an alkylene, heteroalkylene, polydiorganosiloxane, arylene, arylalkylene, alkylarylene, or a combination thereof. Suitable alkylenes often have 2 to 10, 2 to 6, or 2 to 4 carbon atoms. Examples of alkylene groups include ethylene, propylene, and butylene. Suitable heteroalkylenes are often polyoxyalkylenes such as polyoxyethylene having at least 2 ethylene units, polyoxypropylene having at least 2 propylene units, or copolymers thereof. Examples of polydiorganosiloxanes include polydimethylsiloxanes with alkylene terminal groups. Suitable arylalkylene groups usually contain an arylene group having 6 to 12 carbon atoms bonded to an alkylene group having 1 to 10 carbon atoms. Some examples of arylalkylene groups are phenylene-alkylene where the phenylene is bonded to an alkylene having 1 to 10 carbon atoms, 1 to 8 carbon atoms, 1 to 6 carbon atoms, or 1 to 4 carbon atoms. Some examples of alkylarylene groups are alkylene-phenylene where the alkylene having 1 to 10 carbon atoms, 1 to 8 carbon atoms, 1 to 6 carbon atoms, or 1 to 4 carbon atoms is bonded to a phenylene. As used herein with reference to group G, "a combination thereof" refers to a combination of two or more groups selected from an alkylene, heteroalkylene, polydiorganosiloxane, arylene, arylalkylene, and alkylarylene. A combination can be, for example, an arylalkylene bonded to an alkylene (e.g., alkylene-arylene-alkylene). In one example of an alkylene-arylene-alkylene combination, the arylene is phenylene and each alkylene has 1 to 10, 1 to 6, or 1 to 4 carbon atoms.

In some embodiments, the polydiorganosiloxane polyamide is a polydiorganosiloxane polyoxamide. The polydiorganosiloxane polyoxamide tends to be free of groups having a formula $-B-(CO)-NH-$ where B is an alkylene. All of the carbonylamino groups along the backbone of the copolymeric material typically are part of an oxalylamino group (i.e., the $-(CO)-(CO)-NH-$ group), and B is a bond. That is, any carbonyl group along the backbone of the copolymeric material is bonded to another carbonyl group and is part of an oxalyl group. More specifically, the polydiorganosiloxane polyoxamide has a plurality of aminoxalylamino groups.

The polydiorganosiloxane polyamide is a block copolymer and can be an elastomeric material. Unlike many of the known polydiorganosiloxane polyamides that are generally formulated as brittle solids or hard plastics, the polydiorganosiloxane polyamides can be formulated to include greater than 50 weight percent polydiorganosiloxane segments based on the weight of the copolymer. The weight percent of the diorganosiloxane in the polydiorganosiloxane polyamides can be increased by using higher molecular weight polydiorganosiloxanes segments to provide greater than 60 weight percent, greater than 70 weight percent, greater than 80 weight percent, greater than 90 weight percent, greater than 95 weight percent, or greater than 98 weight percent of the polydiorganosiloxane segments in the polydiorganosiloxane polyamides. Higher amounts of the polydiorganosiloxane can be used to prepare elastomeric materials with lower modulus while maintaining reasonable strength.

Some of the polydiorganosiloxane polyamides can be heated to a temperature up to 200° C., up to 225° C., up to 250° C., up to 275° C., or up to 300° C. without noticeable degradation of the material. For example, when heated in a thermogravimetric analyzer in the presence of air, the copolymers often have less than a 10 percent weight loss when scanned at a rate 50° C. per minute in the range of 20° C. to 350° C. Additionally, the copolymers can often be heated at a temperature such as 250° C. for 1 hour in air without apparent degradation as determined by no detectable loss of mechanical strength upon cooling.

The polydiorganosiloxane polyamides are soluble in many common organic solvents such as, for example, toluene, tetrahydrofuran, dichloromethane, aliphatic hydrocarbons (e.g., alkanes such as hexane), or mixtures thereof.

Silicone-polyurethane copolymers (SPU) useful as polymer processing additives in the compositions and methods according to the present disclosure include block copolymers comprising silicone blocks and second blocks derived from a multifunctional isocyanate. At points herein the term silicone-polyurea may be used interchangeable with silicone-polyurethane.

Blocks derived from an isocyanate may have two functional groups (e.g., —NHCONH— or —NHC(O)O—) attached to a divalent organic radical (such as alkyl groups, cycloalkyl groups, and aryl groups, containing from 1 to 30 carbon atoms). Examples of useful diisocyanate compounds from which second blocks may be derived are ethylene diisocyanate, 1,6-hexylene diisocyanate, 1,12-dodecylene diisocyanate, 4,4'-diphenylmethane diisocyanate, 3,3'-dimethoxy-4,4'-diphenylmethane diisocyanate, 3,3'-dimethyl-4,4'-diphenylmethane diisocyanate, 4,4'-diphenyl diisocyanate, toluene-2,6,-diisocyanate, mixtures of toluene-2,6-diisocyanate and toluene-2,4-diisocyanate, 1,4-cyclohexylene diisocyanate, 4,4'-dicyclohexylmethane diisocyanate, 3,3'-diphenyl-4,4'-biphenylene diisocyanate, 4,4'-biphenylene diisocyanate, 2,4-diisocyanatodiphenylether, 2,4-dimethyl-1,3-phenylene diisocyanate, 4,4'-diphenylether diisocyanate, isophorone diisocyanate, and mixtures thereof.

Silicone blocks include those having the general formula (Si(R$^7$)$_2$O—) wherein R$^7$ is as defined above for any of the embodiments of R$^7$ in Formula I. Non-limiting examples include dimethylsilicones, diethylsilicones, and diphenylsilicones.

Polydiorganosiloxane urethane-containing copolymers (a subset of the class of SPU materials) useful in compositions of the present disclosure contain soft polydiorganosiloxane units, hard polyisocyanate residue units, terminal groups and optionally soft and/or hard organic polyamine residue units. Some polydiorganosiloxane urea-containing copolymers are commercially available under the trade designation "GENIOMER 140" available from Wacker Chemie AG, Germany. The polyisocyanate residue is the polyisocyanate minus the —NCO groups, the organic polyamine residue is the organic polyamine minus the —NH groups, and the polyisocyanate residue is connected to the polydiorganosiloxane units or organic polyamine residues by urea linkages. The terminal groups may be non-functional groups or functional groups depending on the purpose of the polydiorganosiloxane urea segmented copolymer.

In some embodiments, the polydiorganosiloxane urethane containing copolymers useful as polymer processing additives contain at least two repeat units of Formula II

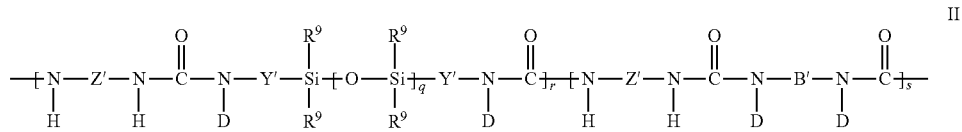

In this Formula II each R$^9$ is a moiety that independently is an alkyl, cycloalkyl, aryl, perfluoroalkyl, or a perfluoroether group. In some embodiments of R$^9$, alkyl has about 1 to 12 carbon atoms and may be substituted with, for example, trifluoroalkyl, vinyl, a vinyl radical or higher alkenyl represented by the formula —R$^{10}$ (CH$_2$)$_a$CH=CH$_2$ wherein R$^{10}$ is —(CH$_2$)$_b$— or —(CH$_2$)$_c$CH=CH— and a is 1, 2 or 3; b is 0, 3 or 6; and c is 3, 4 or 5. In some embodiments of R$^9$, cycloalkyl has about 6 to 12 carbon atoms and may be substituted with one or more alkyl, fluoroalkyl, or vinyl groups. In some embodiments of R$^9$, aryl has about 6 to 20 carbon atoms and may be substituted with, for example, alkyl, cycloalkyl, fluoroalkyl and vinyl groups. In some embodiments of R$^9$, the perfluoroalkyl group is as described in U.S. Pat. No. 5,028,679, wherein such description is incorporated herein by reference, and the perfluoroether-containing group is as described in U.S. Pat. Nos. 4,900,474 and 5,118,775, wherein such descriptions are incorporated herein by reference. In some embodiments, R$^9$ is a fluorine-containing group is as described in U.S. Pat. No. 5,236,997, wherein such description is incorporated herein by reference. In some embodiments, at least 50% of the R$^9$ moieties are methyl radicals with the balance being monovalent alkyl or substituted alkyl radicals having 1 to 12 carbon atoms, alkenylene radicals, phenyl radicals, or substituted phenyl radicals. In Formula II, each Z' is arylene, arylalkylene, alkylene, or cycloalkylene. In some embodiments of Z', the arylene or arylalkylene has from about 6 to 20 carbon atoms. In some embodiments of Z', alkylene or cycloalkylene radical has from about 6 to 20 carbon atoms. In some embodiments, Z' is 2,6-tolylene, 4,4'-methylenediphenylene, 3,3'-dimethoxy-4,4'-biphenylene, tetramethyl-m-xylylene, 4,4'-methylenedicyclohexylene, 3,5,5-trimethyl-3-methylenecyclohexylene, 1,6-hexamethylene, 1,4-cyclohexylene, 2,2,4-trimethylhexylene, or mixtures thereof. In Formula II, each Y' is independently alkylene, arylalkylene, alkylarylene, or arylene. In some embodiments of Y', alkylene has from 1 to 10 carbon atoms. In some embodiments of Y', the arylalkylene, alkylarylene, or arylene has from 6 to 20 carbon atoms. In Formula II, each D is independently hydrogen, an alkyl radical having 1 to 10 carbon atoms, phenyl, or a radical that completes a ring structure including B' or Y' to form a heterocycle. In Formula II, B is a polyvalent radical selected from the group consisting of alkylene, arylalkylene, alkylarylene, cycloalkylene, phenylene, polyalkylene oxide (e.g., polyethylene oxide, polypropylene oxide, polytetramethylene oxide, and copolymers and mixtures thereof). In Formula II, "s" is a number that is 0 to about 1000; "r" is a number that is equal to or greater than 1; and "q" is a number that is about 5 or larger, in some embodiments about 15 to 2000, and in some embodiments about 30 to 1500.

In the use of polyisocyanates (Z' is a radical having a functionality greater than 2) and polyamines (B' is a radical having a functionality greater than 2), the structure of Formula II will be modified to reflect branching at the polymer backbone. In the use of endcapping agents, the structure of Formula II will be modified to reflect termination of the polydiorganosiloxane urea chain.

The linear block copolymers having repeat units of Formula I and polymdiorganolsiloxane urea containing polymers of Formula II can be prepared, for example, as discussed in U.S. Pat. App. Pub. No. 2011-0244159 (Papp et al.).

Polymer processing additives can be selected such that they are melt-processable (e.g. melt-extruded) at a desired extrusion temperature. Melt-processing typically is performed at a temperature from 180° C. to 280° C., although optimum operating temperatures are selected depending upon the melting point, melt viscosity, thermal stability of the composition, and the type of melt-processing equipment used. Generally, the polymer processing additive may have a melt-flow index (measured according to ASTM D1238 at 190° C., using a 2160-gram weight) of 5.0 grams per 10 minutes or less, in some embodiments 2.0 grams per 10 minutes or less. Generally the melt flow indexes are greater than 0.1 or greater than 0.2 gram per 10 minutes. In some embodiments, blends of two different polymer processing agents (e.g., having two different melt flow indexes) are useful. The difference in melt flow index between the two polymer processing additives can be in a range from 2:1 to $10^6$:1, in some embodiments, 5:1 to $10^6$:1, 2:1 to $10^3$:1, or 5:1 to $10^3$:1.

Polymer processing additive compositions according to the present disclosure, which include a silicone-containing polymer or fluoropolymer polymer processing additive, a poly(oxyalkylene) polymer, and a metal salt of a carboxylic acid, sulfonic acid, or alkylsulfate, may be used in the form of powders, pellets, granules of the desired particulate size or size distribution, or in any other extrudable form. These polymer processing additive compositions can contain conventional adjuvants such as antioxidants, hindered amine light stabilizers (HALS), UV stabilizers, metal oxides (e.g., magnesium oxide and zinc oxide), antiblocks (e.g., coated or uncoated), pigments, and fillers (e.g., titanium dioxide, carbon black, and silica). These additives can also be included in the polymer processing additive synergist, as described above in any of its embodiments, before combining the synergist with the polymer processing additive.

HALS are typically compounds that can scavenge free-radicals, which can result from oxidative degradation. Some suitable HALS include a tetramethylpiperidine group, in which the nitrogen atoms on the piperidine may be unsubstituted or substituted by alkyl or acyl. Examples of suitable HALS include decanedioic acid, bis (2,2,6,6-tetramethyl-1-(octyloxy)-4-piperidinyl)ester, bis(2,2,6,6-tetramethyl-4-piperidyl)sebacate, 8-acetyl-3-dodecyl-7,7,9,9-tetramethyl-1,3,8-triazaspiro(4,5)-decane-2,5-dione, bis(2,2,6,6-tetramethyl-4-hydroxypiperidine succinate), and bis(N-methyl-2,2,6,6-tetramethyl-4-piperidyl)secacate. Suitable HALS further include those available, for example, from BASF, Florham Park, N.J., under the trade designations "CHIMAS-SORB". Examples of anti-oxidants include those obtained under the trade designations "IRGAFOS 168", "IRGANOX 1010" and "ULTRANOX 626", also available from BASF. These stabilizers, if present, can be included in the compositions according to the present disclosure in any effective amount, typically up to 5, 2, to 1 percent by weight based on the total weight of the polymer processing additive composition and typically at least 0.1, 0.2, or 0.3 percent by weight.

A useful polymer processing additive composition containing either a fluoropolymer or a silicone-containing polymer can comprise between about 5 and 95 weight percent of the poly(oxyalkylene) polymer component and 95 and 5 weight percent of the fluoropolymer or silicone-containing polymer, wherein the poly(oxyalkylene) polymer component includes the metal salt of a carboxylic acid, sulfonic acid, or alkylsulfate in any of the ratios described above. In some embodiments, a polymer processing additive composition includes at least about 25, 40, or 50 percent by weight of the poly(oxyalkylene) polymer based on the total weight of the polymer processing additive composition. In some embodiments, a polymer processing additive composition includes at least about 0.125, 0.2, or 0.25 percent of the metal salt of a carboxylic acid, sulfonic acid, or alkylsulfate by weight based on the total weight of the polymer processing additive composition. Typically, the ratio of the fluoropolymer or the silicone-containing polymer to the poly(oxyalkylene) polymer component (including the metal salt of a carboxylic acid, sulfonic acid, or alkylsulfate) in the polymer processing additive composition is from 1/2 to 2/1.

In some embodiments, a polymer processing additive synergist disclosed herein including a poly(oxyalkylene) polymer and a metal salt of a carboxylic acid, sulfonic acid, or alkylsulfate is useful in a composition including a polymer processing additive and a homogeneously catalyzed polyolefin.

Homogeneously catalyzed polyolefins are made by homogeneous catalysis. In some embodiments, homogeneous catalysis refers to catalysis in which the catalyst and the substrate are in the same phase (e.g., in solution). In some embodiments, homogeneous catalysis refers to catalysis carried out by catalysts having a single active site. Single site catalysts typically contain a single metal center.

In some embodiments, the homogeneously catalyzed polyolefin is a metallocene-catalyzed polyolefin. Metallocene catalysts typically have one or two cyclopentadienyl anions complexed to a positively charged metal such as zirconium, titanium, or hafnium. It is understood that the cyclopentadienyl groups can be substituted (e.g., by an alkyl, phenyl, or silyl group) or fused to an aromatic ring such as benzene, and two cyclopentadienyl groups or one cyclopentadienyl group and another coordinating group (e.g., N-alkyl, P-alkyl, O, or S) can be connected together through a bridging group (e.g., $(CH_3)_2Si$, $(CH_3)_2C$, or $CH_2CH_2$). The metal can include other ligands such as halogen, hydrogen, alkyl, phenyl, or an additional cyclopentadienyl group. Metallocene catalysts are typically used in combination with methyl alumoxane or borates under homogeneous reaction conditions.

Commercially available metallocene-catalyzed polyolefins include those from Exxon Chemical Company, Baytown, Tex., under the trade designations "EXXPOL", "EXACT", and "VISTAMAXX", and from Dow Chemical Company, Midland, Mich., under the trade designations "AFFINITY" and "ENGAGE".

Homogeneous or single-site catalysts other than metallocene catalysts are also useful for providing homogeneously catalyzed polyolefins. Such catalysts typically include at least one first ligand strongly bonded to a metal (e.g., zirconium, titanium, hafnium, palladium, or nickel) and at least one other ligand that may be labile. The first ligands typically remain bonded to the metal after activation (e.g., by methyl alumoxane or borate), stabilize the single form of the catalyst, do not interfere with polymerization, provide shape to the active site, and electronically modify the metal. Some useful first ligands include bulky, bidentate diimine ligands, salicylimine ligands, tridentate pyridine diimine ligands, hexamethyldisilazane, bulky phenolics, and acetylacetonate. Many of these ligands are described, for example, in Ittel et al., Chem. Rev., 2000, 100, 1169-1203. Other single site catalysts such as those described by Nova Chemicals Corporation, Calgary, Canada, under the trade designation "ADVANCED SCLAIRTECH TECHNOLOGY".

Homogeneously catalyzed polyolefins may have higher molecular weights, lower polydispersity, fewer extractables, and different stereochemistry than polyolefins made by other methods such as Ziegler-Natta catalysis. Homogeneous catalysis also allows for a broader selection of polymerizable monomers than Ziegler-Natta catalysis. Ziegler-Natta catalysis, which employs halogenated transition metal complexes mixed with organometallic compounds, can leave acidic residues in the resultant polyolefin resin. Acid-neutralizing additives such as calcium stearate and zinc stearate have been added to such resins. For homogeneously catalyzed polyolefins, such acidic residues are generally not present; therefore acid-neutralizing additives are not generally required.

Examples of useful homogeneously catalyzed polyolefins include those having the general structure $CH_2=CHR^{10}$, wherein $R^{10}$ is a hydrogen or alkyl. In some embodiments, alkyl includes up to 10 carbon atoms or from one to six carbon atoms. Homogeneously catalyzed polyolefins can include polyethylene, polypropylene, poly (1-butene), poly (3-methylbutene), poly (4-methylpentene), copolymers of ethylene with propylene, 1-butene, 1-hexene, 1-octene, 1-decene, 4-methyl-1-pentene, and 1-octadecene, blends of polyethylene and polypropylene, linear or branched low-density polyethylenes (e.g. those having a density of from 0.89 to 0.94 g/cm$^3$), and high-density polyethylenes (e.g., those having a density of e.g. from 0.94 to about 0.98 g/cm$^3$). In some embodiments, the homogeneously catalyzed polyolefin is linear low density polyethylene. In any of these embodiments, the homogeneously catalyzed polyolefin may be a metallocene-catalyzed polyolefin.

In some embodiments, a polymer processing additive synergist disclosed herein including a poly(oxyalkylene) polymer and a metal salt of a carboxylic acid, sulfonic acid, or alkylsulfate is useful in a composition including a polymer processing additive and a thermoplastic, melt-processable polymer. A wide variety of non-fluorinated polymers are useful as melt-processable polymers. Examples of useful thermoplastic polymers include hydrocarbon resins, polyamides (e.g., nylon 6, nylon 6/6, nylon 6/10, nylon 11 and nylon 12), polyester (e.g., poly (ethylene terephthalate) and poly (butylene terephthalate)), chlorinated polyethylene, polyvinyl resins (e.g., polyvinylchloride, polyacrylates and polymethylacrylates), polycarbonates, polyketones, polyureas, polyimides, polyurethanes, polyolefins and polystyrenes.

Useful melt-processable polymers have melt flow indexes (measured according to ASTM D1238 at 190° C., using a 2160-gram weight) of 5.0 grams per 10 minutes or less, or 2.0 grams per 10 minutes or less. Generally the melt flow indexes of melt-processable polymers are at least 0.1 or 0.2 grams per 10 minutes.

In some embodiments of the compositions and methods according to the present disclosure, useful melt-processable polymers are hydrocarbon polymers, for example, polyolefins prepared by any useful method. Examples of useful polyolefins include those having the general structure $CH_2=CHR^{10}$ wherein $R^{10}$ is a hydrogen or alkyl. In some embodiments, the alkyl radical includes up to 10 carbon atoms or from one to six carbon atoms. Melt-processable polyolefins include polyethylene, polypropylene, poly (1-butene), poly (3-methylbutene), poly (4-methylpentene), copolymers of ethylene with propylene, 1-butene, 1-hexene, 1-octene, 1-decene, 4-methyl-1-pentene, and 1-octadecene, blends of polyethylene and polypropylene, linear or branched low-density polyethylenes (e.g. those having a density of from 0.89 to 0.94 g/cm$^3$), high-density polyethylenes (e.g., those having a density of e.g. from 0.94 to about 0.98 g/cm$^3$), and polyethylene and olefin copolymers containing copolymerizable monomers (e. g., ethylene and acrylic acid copolymers; ethylene and methyl acrylate copolymers; ethylene and ethyl acrylate copolymers; ethylene and vinyl acetate copolymers; ethylene, acrylic acid, and ethyl acrylate copolymers; and ethylene, acrylic acid, and vinyl acetate copolymers). Melt-processable polymers include the metallic salts of the olefin copolymers, or blends thereof, that contain free carboxylic acid groups (e.g., polymers that include copolymerized acrylic acid). Illustrative of the metals that can be used to provide the salts of said carboxylic acids polymers are the one, two, and three valence metals such as sodium, lithium, potassium, calcium, magnesium, aluminum, barium, zinc, zirconium, beryllium, iron, nickel, and cobalt.

The polyolefins useful for practicing the present disclosure may be obtained by the homopolymerization or copolymerization of olefins. Useful polyolefins may be copolymers of one or more olefins and up to about 30 weight percent or more, in some embodiments, 20 weight percent or less, of one or more monomers that are copolymerizable with such olefins. Representative monomers that are copolymerizable with the olefins include: vinyl ester monomers such as vinyl acetate, vinyl propionate, vinyl butyrate, vinyl chloroacetate, and vinyl chloropropionate; acrylic and alpha-alkyl acrylic acid monomers and their alkyl esters, amides, and nitriles such as acrylic acid, methacrylic acid, ethacrylic acid, methyl acrylate, ethyl acrylate, N,N-dimethyl acrylamide, methacrylamide, and acrylonitrile; vinyl aryl monomers such as styrene, o-methoxystyrene, p-methoxystyrene, and vinyl naphthalene; vinyl and vinylidene halide monomers such as vinyl chloride, vinylidene chloride, and vinylidene bromide; alkyl ester monomers of maleic and fumaric acid and anhydrides thereof such as dimethyl maleate, diethyl maleate, and maleic anhydride; vinyl alkyl ether monomers such as vinyl methyl ether, vinyl ethyl ether, vinyl isobutyl ether, and 2-chloroethyl vinyl ether; vinyl pyridine monomers; N-vinyl carbazole monomers; and N-vinyl pyrolidine monomers.

Thermoplastic polymers useful for practicing any of the embodiments of the present disclosure can contain any of the conventional adjuvants described above in any of their embodiments such as antioxidants, hindered amine light stabilizers (HALS), UV stabilizers, metal oxides (e.g., magnesium oxide and zinc oxide), antiblocks (e.g., coated or uncoated), pigments, and fillers (e.g., titanium dioxide, carbon black, and silica. In some embodiments, the thermoplastic polymer, before it is combined with a polymer processing additive synergist disclosed herein, is free of metal stearates. In some embodiments, the thermoplastic polymer, before it is combined with a polymer processing additive synergist disclosed herein, is free of any metal salt of a carboxylic acid, sulfonic acid, or alkylsulfate.

The thermoplastic polymers may be used in the form of powders, pellets, granules, or in any other extrudable form. Compositions according to the present disclosure can be prepared by any of a variety of ways. For example, polymer processing additive compositions can be mixed with the thermoplastic polymers during the extrusion into polymer articles. They can also be provided as polymer compositions, so-called masterbatches, which may contain further components and/or one or more host thermoplastic polymers. A masterbatch can be a useful, diluted form of the polymer processing additive. Typically, masterbatches contain the fluoropolymer or silicone-containing polymer processing additive dispersed in or blended with a host polymer, which can be a homogeneously catalyzed polyolefin, metallocene-catalyzed polyolefin, or any of the thermoplastics described above. Preparation of a masterbatch may allow for more accurate amounts of a polymer processing additive to be added to an extrudable composition, for example. The masterbatch may be a composition ready to be added to a thermoplastic polymer for being extruded into a polymer article. Masterbatches, which include concentrations of polymer processing additives as described below, are often prepared at relatively high temperatures under aerobic conditions.

The thermoplastic polymer to be extruded and the polymer processing additive composition can be combined together by any of the blending means usually employed in the plastics industry, such as with a compounding mill, a Banbury mixer, or a mixing extruder in which the polymer processing additive composition is uniformly distributed throughout the host thermoplastic polymer. The mixing operation is most conveniently carried out at a temperature above the melting point or softening point of the fluoropolymer or silicone-containing polymer although it is also possible to dry-blend the components in the solid state as particulates and then cause uniform distribution of the components by feeding the dry blend to a twin-screw melt extruder.

The resulting melt-blended mixture can be pelletized or otherwise comminuted into a desired particulate size or size distribution and fed to an extruder, which typically will be a single-screw extruder, that melt-processes the blended mixture. Melt-processing typically is performed at a temperature from 180° C. to 280° C., although optimum operating temperatures are selected depending upon the melting point, melt viscosity, and thermal stability of the blend. Different types of extruders that may be used to extrude the compositions of this invention are described, for example, by Rauwendaal, C., "Polymer Extrusion", Hansen Publishers, p. 23-48, 1986. The die design of an extruder can vary, depending on the desired extrudate to be fabricated. For example, an annular die can be used to extrude tubing, useful in making fuel line hose, such as that described in U.S. Pat. No. 5,284,184 (Noone et al.).

Such compositions may be mixed with further non-fluorinated polymer and/or further components to obtain a composition ready for processing into a polymer article. The composition may also contain all required ingredients and are ready for being extruded into a polymer article. The amount of polymer processing additive in these compositions is typically relatively low. The exact amount used may be varied depending upon whether the extrudable composition is to be extruded into its final form (e. g., a film) or whether it is to be used as a masterbatch or processing additive which is to be (further) diluted with additional host polymer before being extruded into its final form.

Generally, an extrudable composition, which in some embodiments is a homogeneously catalyzed or metallocene-catalyzed polyolefin composition, includes the polymer processing additive (e.g., fluoropolymer or silicone-containing polymer) and the polymer processing additive synergist disclosed herein in a combined weight in a range from about 0.002 to 10 weight percent, based on the total weight of the extrudable composition. In some embodiments, the combined weight of the polymer processing additive and the polymer processing additive synergist is in a range from 0.01 percent to 10 percent, based on the total weight of the extrudable composition. In a masterbatch composition, the combined weight of the polymer processing additive and the polymer processing additive synergist is in a range from 1 percent to 10 percent, in some embodiments, 1 percent to 5 percent, 2 percent to 10 percent, or 2 percent to 5 percent, based on the total weight of the composition. If the extrudable composition is to be extruded into final form and is not further diluted by the addition of host polymer, it typically contains a lower concentration of polymer processing additive composition. In some of these embodiments, the combined weight of the polymer processing additive and the polymer processing additive synergist is in a range from about 0.002 to 2 weight percent, in some embodiments about 0.01 to 1 weight percent, or 0.01 to 0.2 weight percent, based on the total weight of the extrudable composition. The upper concentration of polymer processing additive used is generally determined by economic limitations rather than by any adverse physical effect of the concentration of the polymer processing additive.

The present disclosure can therefore provide a thermoplastic polymer; a polymer processing additive selected from the group consisting of a fluoropolymer and a silicone-containing polymer; and a polymer processing additive synergist comprising a poly(oxyalkylene) polymer and a metal salt of a carboxylic acid, sulfonic acid, or alkylsulfate in which one or more of the following conditions is met: the polymer processing additive and polymer processing additive synergist together provide up to one percent by weight, based on the total weight of the composition, the metal salt is other than calcium stearate, or wherein the poly(oxyalkylene) polymer is present at least at 85% by weight, based on the total weight of the polymer processing additive synergist (that is, the poly(oxyalkylene) polymer and a metal salt of a carboxylic acid, sulfonic acid, or alkylsulfate). Typically, if a metal stearate salt is used as an acid-neutralizing stabilizer in both a masterbatch thermoplastic polymer and a let-down thermoplastic polymer (e.g., in a polyolefin prepared by Ziegler-Natta catalysis), the final ratio of PEG to the stearate is typically less than 85:15 and may be closer to 50:50, for example.

The polymer processing additive composition according to the present disclosure is useful in the extrusion of thermoplastic polymers (e.g., non-fluorinated polymers), which includes for example, extrusion of films, extrusion blow molding, injection molding, pipe, wire and cable extrusion, and fiber production.

The data included in the Examples, below, clearly show that the addition of metal salts of carboxylic acids, sulfonic acids, or alkylsulfates to PEG increases the onset temperature of degradation as determined by a thermo-gravimetric analyzer (TGA). In some embodiments, the addition of metal salts of carboxylic acids, sulfonic acids, or alkylsulfates to a poly(oxyalkylene) polymer (e.g., PEG) increases the onset temperature of degradation of the poly(oxyalkylene) polymer by at least 20, 30, 40, 50, 60, 70, 80, 90, or 100 degrees as determined by TGA. In some embodiments, the addition of metal salts of carboxylic acids, sulfonic acids, or alkylsulfates to a poly(oxyalkylene) polymer (e.g., PEG) and a polymer processing additive (e.g., a fluoropolymer or a silicone-containing polymer) increases the onset temperature of degradation of the mixture of the poly(oxyalkylene) polymer and the polymer processing additive by at least 20, 30, 40, 50, 60, 70, 80, 90, or 100 degrees as determined by TGA. The data also show that magnesium oxide does not offer as much stabilization as most of the metal salts of carboxylic acid, sulfonic acid, or alkylsulfate evaluated. However, combinations of metal oxides and metal salts of carboxylic acids, sulfonic acids, or alkylsulfates can be useful.

Metal salts of carboxylic acids, sulfonic acids, or alkylsulfates were also compared to various antioxidants as described in Tables 4 and 5. The data show that a combination of antioxidant and stearate can outperform the individual components. The derivative of the TGA curves was also evaluated. In these curves, each peak is indicative of a specific degradation process. These derivative curves clearly showed that addition of salts of carboxylic acids, sulfonic acids, or alkylsulfates can outperform conventional antioxidant.

As described herein and demonstrated in the Examples, below, combinations of a poly(oxyalkylene) polymer (e.g., a polyethylene glycol) and a metal salt of a carboxylic acid, a sulfonic acid, or an alkylsulfate typically have significantly higher thermal stability than the poly(oxyalkylene) polymer alone. Improved thermal stability of the poly(oxyalkylene) polymer can allow polymer processing, including master batch processing and extrusion, at higher temperatures. Typically and advantageously, polymeric compositions that include combinations of a poly(oxyalkylene) polymer (e.g., a polyethylene glycol) and a metal salt of a carboxylic acid, a sulfonic acid can be processed at temperatures of at least 220° C., 230° C., 240° C., 250° C., 260° C., 270° C., 280° C., 290° C., or 300° C. or higher.

Thermal stabilities of end capped PEG's were also evaluated as described in the Examples, below. As shown in Table 7, an ether or ester-linked end cap on the PEG improves thermal stability, but to a lesser extent than the addition of a stearate, suggesting that the improvement is not simply related to the esterification of the chain ends by the stearate salt.

Two stearates were added to polycaprolactone (PCL), which, like PEG, is also used as a synergist in polymer processing additives. As shown in Table 8, stearates were not shown to improve the thermal stability of polycaprolactone, as measured by TGA.

Some Embodiments of the Disclosure

In a first embodiment, the present disclosure provides a composition comprising:
a homogeneously catalyzed polyolefin;
a polymer processing additive selected from the group consisting of a fluoropolymer and a silicone-containing polymer; and
a polymer processing additive synergist comprising a poly(oxyalkylene) polymer and a metal salt of a carboxylic acid, sulfonic acid, or alkylsulfate.

In a second embodiment, the present disclosure provides a method of reducing melt defects during the extrusion of a homogeneously catalyzed polyolefin, the method comprising:
combining a homogeneously catalyzed polyolefin, a polymer processing additive selected from the group consisting of a fluoropolymer and a silicone-containing polymer polymer, and a polymer processing additive synergist comprising a poly(oxyalkylene) polymer and a metal salt of a carboxylic acid, sulfonic acid, or alkylsulfate to provide an extrudable composition; and
extruding the extrudable composition.

In a third embodiment, the present disclosure provides a method of reducing melt defects during the extrusion of a thermoplastic polymer, the method comprising:
providing a polymer processing additive composition comprising a polymer processing additive selected from the group consisting of a fluoropolymer and a silicone-containing polymer and a polymer processing additive synergist comprising a poly(oxyalkylene) polymer and a metal salt of a carboxylic acid, sulfonic acid, or alkylsulfate;
providing an extrudable polymer;
admixing the polymer processing additive composition and the extrudable polymer to provide an extrudable composition; and
extruding the extrudable composition.

In a fourth embodiment, the present disclosure provides the method of the second or third embodiment, wherein providing the polymer processing additive composition comprises:
combining the poly(oxyalkylene) polymer and the metal salt of the carboxylic acid, sulfonic acid, or alkylsulfate to provide the polymer processing additive synergist; and
combining the polymer processing additive synergist with the polymer processing additive.

In a fifth embodiment, the present disclosure provides the method of the second, third, or fourth embodiment, wherein when providing the extrudable polymer, the extrudable polymer is free of metal stearates.

In a sixth embodiment, the present disclosure provides the composition or method of any one of the first to fifth embodiments, wherein the extrudable polymer or homogeneously catalyzed polyolefin is a metallocene-catalyzed polyolefin.

In a seventh embodiment, the present disclosure provides the composition or method of any one of the first to sixth embodiments, wherein the extrudable polymer or homogeneously catalyzed polyolefin is a linear low density polyethylene.

In an eighth embodiment, the present disclosure provides the composition or method of any one of the first to seventh embodiments, wherein the polymer processing additive is a fluoropolymer.

In a ninth embodiment, the present disclosure provides the composition or method of any one of the first to eighth embodiments, wherein the combined weight of the polymer processing additive and the polymer processing additive synergist is in a range from 0.01 percent to 10 percent, based on the total weight of the composition or the extrudable composition.

In a tenth embodiment, the present disclosure provides the composition or method of any one of the first to ninth embodiments, wherein the poly(oxyalkylene) polymer is present at least at 85% by weight, based on the total weight of the polymer processing additive synergist (that is, the poly(oxyalkylene) polymer and a metal salt of a carboxylic acid, sulfonic acid, or alkylsulfate).

In an eleventh embodiment, the present disclosure provides a polymer processing additive composition comprising:
a fluoropolymer;
a poly(oxyalkylene) polymer; and
a metal salt of a carboxylic acid, sulfonic acid, or alkylsulfate,
wherein the poly(oxyalkylene) polymer is present in an amount of at least 50% by weight, based on the total weight of the polymer processing additive composition, wherein the metal salt is other than calcium stearate.

In a twelfth embodiment, the present disclosure provides a polymer processing additive composition comprising:
a fluoropolymer;
a poly(oxyalkylene) polymer; and
a metal salt of a carboxylic acid, sulfonic acid, or alkylsulfate,
wherein the poly(oxyalkylene) polymer is present in an amount of at least 85% by weight, based on the total weight of the poly(oxyalkylene) polymer and the metal salt, and wherein the metal salt is other than calcium stearate.

In a thirteenth embodiment, the present disclosure provides the composition or method of any one of the first to twelfth embodiments, wherein the metal salt is a metal salt of a carboxylic acid or a sulfonic acid.

In a fourteenth embodiment, the present disclosure provides the composition or method of the thirteenth embodiment, wherein the metal salt is a metal salt of a carboxylic acid.

In a fifteenth embodiment, the present disclosure provides the composition or method of the fourteenth embodiment, wherein the metal salt is a metal salt of an aliphatic carboxylic acid.

In a sixteenth embodiment, the present disclosure provides the composition or method of the fourteenth or fifteenth embodiment, wherein the carboxylic acid is other than stearic acid.

In a seventeenth embodiment, the present disclosure provides the composition or method of any one of the first to sixteenth embodiments, wherein the metal salt is a sodium or potassium salt.

In an eighteenth embodiment, the present disclosure provides the composition or method of any one of the first to sixteenth embodiments, wherein the metal salt is a zinc or calcium salt.

In a nineteenth embodiment, the present disclosure provides the composition or method of any one of the first to eighteenth embodiments, wherein the composition, the polymer processing additive composition, or the extrudable composition further comprises at least one of an antioxidant or a hindered amine light stabilizer.

In a twentieth embodiment, the present disclosure provides the composition or method of any one of the first to nineteenth embodiments, wherein the composition, the polymer processing additive composition, or the extrudable composition further comprises a metal oxide.

In a twenty-first embodiment, the present disclosure provides the composition or method of any one of the first to twentieth embodiments, wherein the poly(oxyalkylene) polymer is a polyethylene glycol.

In a twenty-second embodiment, the present disclosure provides the composition or method of any one of the first to twenty-first embodiments, wherein the fluoropolymer has a Mooney viscosity ML 1+10@121° C. in a range from about 30 to less than 60 according to ASTM D1646-06 Part A.

In a twenty-third embodiment, the present disclosure provides the composition or method of any one of the first to twenty-first embodiments, wherein the fluoropolymer has a Mooney viscosity ML 1+10@121° C. in a range from about 60 to about 90 according to ASTM D1646-06 Part A.

In a twenty-fourth embodiment, the present disclosure provides a polymer processing additive synergist comprising a poly(oxyalkylene) polymer and a metal salt of a carboxylic acid, sulfonic acid, or alkylsulfate, wherein the polymer processing additive synergist does not include a fluoropolymer or a polyolefin.

In a twenty-fifth embodiment, the present disclosure provides the use of a poly(oxyalkylene) polymer and a metal salt of a carboxylic acid, sulfonic acid, or alkylsulfate as a polymer processing additive synergist.

In a twenty-sixth embodiment, the present disclosure provides the polymer processing additive synergist or use of the twenty-fourth or twenty-fifth embodiment, wherein the poly(oxyalkylene) polymer is present at least at 85% by weight, based on the total weight of the polymer processing additive synergist.

In a twenty-seventh embodiment, the present disclosure provides the polymer processing additive synergist or use of any one of the twenty-fourth to twenty-sixth embodiments, wherein the metal salt is a metal salt of a carboxylic acid or a sulfonic acid.

In a twenty-eighth embodiment, the present disclosure provides the polymer processing additive synergist or use of the twenty-seventh embodiment, wherein the metal salt is a metal salt of a carboxylic acid.

In a twenty-ninth embodiment, the present disclosure provides the polymer processing additive synergist or use of the twenty-eighth embodiment, wherein the metal salt is a metal salt of an aliphatic carboxylic acid.

In a thirtieth embodiment, the present disclosure provides the polymer processing additive synergist of the twenty-eighth or twenty-ninth embodiment, wherein the carboxylic acid is other than stearic acid.

In a thirty-first embodiment, the present disclosure provides the polymer processing additive synergist or use of any one of the twenty-fourth to thirtieth embodiments, wherein the metal salt is a sodium or potassium salt.

In a thirty-second embodiment, the present disclosure provides the polymer processing additive synergist or use of any one of the twenty-fourth to thirtieth embodiments, wherein the metal salt is a zinc or calcium salt.

In a thirty-third embodiment, the present disclosure provides the polymer processing additive synergist or use of any one of the twenty-fourth to thirty-second embodiments, further comprising at least one of an antioxidant or a hindered amine light stabilizer.

In a thirty-fourth embodiment, the present disclosure provides the polymer processing additive synergist or use of any one of the twenty-fourth to thirty-third embodiments, further comprising a metal oxide.

In a thirty-fifth embodiment, the present disclosure provides the polymer processing additive synergist of any one of the twenty-fourth to thirty-fourth embodiments, wherein the poly(oxyalkylene) polymer is a polyethylene glycol.

In a thirty-sixth embodiment, the present disclosure provides a polymer processing additive composition including a silicone-containing polymer processing additive and the polymer processing additive synergist of any one of the twenty-fourth to thirty-fifth embodiments.

In order that this disclosure can be more fully understood, the following examples are set forth. It should be understood that these examples are for illustrative purposes only and are not to be construed as limiting this disclosure in any manner.

EXAMPLES

In these examples, all amounts are expressed in parts by weight. Abbreviations include g=grams, min=minutes, hrs=hours, rpm=revolutions per minute, wt=weight, EX=example, CE=comparative example, HALS=hindered amine light stabilizers, TGA=thermo gravimetric analysis. PEG=polyethylene glycol, PCL=polycaprolactone, Me= methyl, MW=molecular weight, PPA=polymer processing additive, MF=melt fracture, MB=master batch, MI=melt index in grams per ten minutes, LLDPE=linear low density polyethylene, AO=antioxidant.

Materials

| Acronym | Description | TGA Onset (neat) (° C.) |
|---|---|---|
| "FX-9613" | A partially fluorinated fluoroelastomer (FKM) processing aid commercially available from 3M Company, St. Paul, MN, USA under the trade name "3M DYNAMAR POLYMER PROCESSING ADDITIVE FX-9613" | — |
| "FC-1650" | A partially fluorinated fluoroelastomer (FKM) commercially available from 3M Company under the trade name "3M DYNEON FLUOROELASTOMER FC-1650", with a Mooney viscosity of 47 | |
| "FC-2299" | A partially fluorinated fluoroelastomer (FKM) commercially available from 3M Company under the trade name "3M DYNEON FLUOROELASTOMER FC-2299", with a Mooney viscosity of 100 | |
| "VITON FREEFLOW Z100" | A partially fluorinated fluoroelastomer (FKM) and PEG processing additive commercially available from E. I. duPont de Nemours and Co., Wilmington, DE, USA under the trade name "DuPONT VITON FREEFLOW Z100". According to the manufacturer literature, this polymer has a Mooney viscosity of approximately 70 | |
| LLDPE 0.5 | 0.5 MI metallocene LLDPE available as "ENABLE 20-05CB" from Exxon Mobil, Irving, TX | |
| LLDPE 2.0 | 2.0 MI Ziegler-Natta LLDPE available as "EXXONMOBIL LLDPE LL 1002.09" from Exxon Mobil as a granular resin | |
| LLDPE 0.9 | 0.9 MI Ziegler-Natta LLDPE available as "MARFLEX 7109" from Chevron Phillips Chemical Co. LP, The Woodlands, TX | |
| PEG 8000 | Poly(Ethylene Glycol), 8000 MW available from Ineos Group, Switzerland | 205 |
| $C_{18}$-PEG-$C_{18}$ | Poly(Ethylene Glycol) Di stearate, 6000 MW available from Spectrum Chemical Mfg. Corp., NJ | 236 |
| PEG 2000 | Poly(Ethylene Glycol), 2000 MW available from Sigma-Aldrich, MO | 210 |
| Me-PEG 2000 | Poly(Ethylene Glycol) Methyl Ether, 2000 MW available from Sigma-Aldrich, St. Louis, MO | 241 |
| PCL | Polycaprolactone available as "TONE 1278" from Dow, Midland, MI | 294 |
| AO1 | Sterically hindered phenolic antioxidant available from BASF, Florham Park, NJ under the trade name "IRGANOX 1010" | 323 |
| AO2 | Sterically hindered phenolic antioxidant available from BASF under the trade name "IRGANOX 1076" | 273 |
| AO3 | Trisarylphosphite antioxidant available from BASF under the trade name "IRGAFOS 168" | 265 |
| AO4 | Blend of "IRGAFOS 168" and "IRGANOX 1010" available from BASF under the trade name "IRGANOX B225" | 268 |
| AO5 | Hindered amine light stabilizer (HALS) antioxidant available from BASF under the trade name "CHIMASSORB 944" | 324 |
| AO6 | Blend of "IRGAFOS 168" and "IRGANOX 1076" available from BASF under the trade name "IRGANOX B 900" | |
| MgO | Magnesium Oxide available as "MAGLITE Y" from Hallstar Co., Chicago, IL | NA |
| ZnO | Zinc Oxide available as "AZO77HSA" from US Zinc, Houston, TX | NA |
| Stearic Acid | Available from EMD Chemicals, Philadelphia, PA | 204 |
| Al Stearate | Available as "MATHE ALUMINUM STEARATE NO. 9" from Norac Additives, Helena, AR | 225 |
| Ba Stearate | TCI America, Portland, OR | 253 |
| Ca Stearate | Baerlocher Cleveland, OH | 390 |
| K Stearate | Available as "MATHE POTASSIUM STEARATE" Norac Additives, Helena, AR | 338 |
| Mg Stearate | Norac Additives, Helena, AR | 309 |
| Na Stearate | Available as "MATHE SODIUM STEARATE" Norac Additives, Helena, AR | 328 |
| Zn Stearate | Alfa Aesar, Ward Hill, MA | 285 |
| Zn Acetate | Zinc Acetate dihydrate available from J. T. Baker Chemical Co, Phillipsburg, NJ | — |
| Na Acetate | Alfa Aesar, Ward Hill, MA | — |
| Na Caprylate | Sodium caprylate available from Nu-Chek Prep, Elysian, MN | — |
| Na Laurate | Sodium laurate available from Nu-Chek Prep, Elysian, MN | — |
| Na Behenate | Sodium behenate available from Nu-Chek Prep, Elysian, MN | — |
| Mono Na C12 Phosphate | Sodium Monododecyl Phosphate, Sigma Aldrich, St. Louis, MO | — |
| Mono/Di Mix Na C12 Phospahte | Sodium Monododecyl Phosphate (mixture of mono and di salt) available from TCI America, Portland, OR | — |
| Na C10 Sulfonate | Sodium 1-Decane Sulfonate, Alfa Aesar, Ward Hill, MA | — |

-continued

| Acronym | Description | TGA Onset (neat) (° C.) |
|---|---|---|
| Na Lauryl Sulfate | Sodium Lauryl Sulfate available from Alfa Aesar, Ward Hill, MA | — |
| Na Phthalate | Disodium phthalate (Bioscience Inc, , Allentown, PA) | |
| Zn Phthalate | Prepared by dissolving 2.1 g of disodium phthalate (Bioscience) in 20 ml of deionized water. 4.2 g of $ZnNO_3$ (Integra) was dissolved in 30 ml of deionized water. The 2 solutions were mixed together and allowed to crystallize overnight. The suspension was filtered using a Buchner funnel and rinsed with deionized water. The solids were placed to dry in an oven at 110° C. for 2 hr (yield 0.5 g). | |
| Talc | Talc ABT(R*) 2500, Barretts Minerals Inc. (wholly owned Subsidiary of Specialty Minerals, Inc.), Dillon, MT | |
| Calcium Carbonate | GAMA-SPERSE 80, Imerys Pigments & Additives Group, Rosewell, GA | |

Thermal Stability

The thermal stability was measured using a Perkin Elmer Pyris 1 Thermo-Gravimetric Analyzer (TGA), with a heating rate of 10° C./min under air, with a gas flow of 20 cc/min. The temperature was ramped from approximately 30° C. to 750° C. The sample size varied between approximately 5 mg and 20 mg. The decomposition onset was obtained from the Perkin Elmer software (V. 10.1.0.0412) using the two points at 50° C. and 90% weight loss to draw two tangent lines. The intercept between those lines is reported as the onset of decomposition.

Powder blends for thermal stability evaluation were prepared using a mortar and pestle, by mixing the relative amounts of each component to obtain 2 to 10 g batches. Some blends were prepared by successive dilution. All proportions are indicated as weight percent (wt %).

Because the decomposition onset temperature is affected by the sample weight, the onset was measured for 6 neat PEG samples with weights between 4 an 26 mg (Table 1 below). A second order equation was fitted to the data with an $R^2$ of 0.995. Using this regression, the expected onset for each sample of the examples was obtained based on their weight. The difference between the measured onset and expected onset was then calculated and results shown in Tables 3, 5 and 6.

Mooney Viscosity

Mooney viscosity was determined for "FC-1650" and "FC-2299" using ASTM D1646-06 Part A by a MV 2000 instrument (available from Alpha Technologies, Ohio, USA) using a large rotor (ML 1+10) at 121° C. The Mooney viscosities reported are in Mooney units.

TABLE 1

| PEG Decomposition Onset (° C.) by TGA for varying weight samples | |
|---|---|
| Sample Weight (mg) | Measured Onset (° C.) |
| 4.319 | 190 |
| 6.442 | 201 |
| 10.932 | 228 |
| 15.871 | 242 |
| 18.265 | 248 |
| 26.585 | 264 |

Synergist Examples

Example PEG decomposition onset temperatures for various stearate salts and mixtures with oxides are reported in Table 2. The 100% column reports the onset for the pure stearate salts. Table 1 shows a temperature of 189° C. to 264° C. for pure PEG 8000 (0% additive). Table 3 shows the difference between the measured and expected onset of degradation for the same blends. When blends were used, the concentration refers to the total level of additive in PEG.

TABLE 2

| | | PEG Decomposition Onset (° C.) by TGA | | | | | | | |
|---|---|---|---|---|---|---|---|---|---|
| EX | Additive (wt % in PEG) | 0.2 | 0.5 | 1 | 2.5 | 5 | 10 | 15 | 100 |
| | Stearic Acid | | | | | 255 | | | 204 |
| A | Ca Stearate | 279 | | | | 341 | | | 390 |
| B | Ba Stearate | | | | 298 | 327 | 282 | 279 | 253 |
| C | K Stearate | | | | 341 | 321 | 272 | 305 | 338 |
| D | Zn Stearate | | 304 | 315 | 329 | 338 | 319 | 283 | 285 |
| E | 1:1 Ba Stearate/K Stearate | | | | | | 309 | | 327 |
| F | 1:1 Zn Stearate/Ba Stearate | | | | | | 303 | | 306 |
| G | 1:1 Zn Stearate/K Stearate | | | | | | 322 | 333 | 323 307 |
| | MgO | 253 | | | | 258 | | | *NM |
| | ZnO | 258 | | | | 274 | | | NM |
| H | 1:1 ZnO/Zn Stearate | | | | | 337 | | | NM |

*NM = not measured

TABLE 3

PEG Decomposition Onset Difference (° C.) by TGA

| EX | Additive (wt % in PEG) | 0.2 | 0.5 | 1 | 2.5 | 5 | 10 | 15 |
|---|---|---|---|---|---|---|---|---|
|   | Stearic Acid |   |   |   |   | −6 |   |   |
| A | Ca Stearate | 15 |   |   |   | 80 |   |   |
| B | Ba Stearate |   |   | 68 | 77 | 82 | 80 |   |
| C | K Stearate |   |   |   | 83 | 84 | 71 | 101 |
| D | Zn Stearate |   | 46 | 59 | 83 | 108 | 112 | 85 |
| E | 1:1 Ba Stearate/K Stearate |   |   |   |   | 103 |   |   |
| F | 1:1 Zn Stearate/Ba Stearate |   |   |   |   | 99 |   |   |
| F | 1:1 Zn Stearate/K Stearate |   |   |   |   | 118 | 123 | 111 |
|   | MgO | 13 |   |   |   | 28 |   |   |
|   | ZnO | 11 |   |   |   | 16 |   |   |
| H | 1:1 ZnO/Zn Stearate |   |   |   |   | 88 |   |   |

The stearates were also compared to various antioxidants and their blends with stearates (Tables 4 and 5). The concentration refers to the total amount of additive.

TABLE 4

PEG Decomposition Onset (° C.) by TGA

| EX | Additive (wt % in PEG) | 2.5 | 5 | 10 | 100 |
|---|---|---|---|---|---|
|   | AO1 |   | 311 |   | 323 |
|   | AO2 |   | 308 |   | 273 |
|   | AO3 |   | 242 |   | 265 |
|   | AO4 | 304 | 289 |   | 268 |
| D | Zn Stearate | 329 | 338 | 319 | 285 |
| I | 1:1 Zn Stearate/AO1 |   | 361 |   |   |
| J | 1:1 Zn Stearate/AO2 |   | 337 | 350 |   |
| K | 1:1 Zn Stearate/AO3 |   | 337 | 307 |   |
| L | 1:1 Zn Stearate/AO4 |   | 345 | 333 |   |
| C | K Stearate | 341 | 321 | 272 | 338 |
| M | 1:1 K Stearate/AO1 |   | 315 |   |   |
| N | 1:1 K Stearate/AO3 |   | 350 |   |   |
| O | 1:1 K Stearate/AO4 |   | 269 |   |   |
| B | Ba Stearate | 298 | 327 | 282 | 253 |
| P | 1:1 Ba Stearate/AO2 |   | 326 | 334 |   |
| Q | 1:1 Ba Stearate/AO4 |   | 334 | 330 |   |
|   | AO5 |   | 261 |   | 324 |
| R | 1:1 Zn Stearate/AO5 |   | 360 |   |   |
| S | 2.5 Zn Stearate + 2.5 Ba Stearate + 5.0 AO5 |   |   | 309 |   |

TABLE 5

PEG Decomposition Onset Difference (° C.) by TGA, for Various Antioxidant Blends

| EX | Additive (wt % in PEG) | 2.5 | 5 | 10 |
|---|---|---|---|---|
|   | AO1 |   | 114 |   |
|   | AO2 |   | 49 |   |
|   | AO3 |   | 47 |   |
|   | AO4 | 75 | 93 |   |
| D | Zn Stearate | 83 | 108 | 112 |
| I | 1:1 Zn Stearate/AO1 |   | 101 |   |
| J | 1:1 Zn Stearate/AO2 |   | 104 | 108 |
| K | 1:1 Zn Stearate/AO3 |   | 76 | 67 |
| L | 1:1 Zn Stearate/AO4 |   | 113 | 113 |
| C | K Stearate | 83 | 84 | 68 |
| M | 1:1 K Stearate/AO1 |   | 122 |   |
| N | 1:1 K Stearate/AO3 |   | 88 |   |
| O | 1:1 K Stearate/AO4 |   | 63 |   |
| B | Ba Stearate | 68 | 88/77[a] | 77 |
| P | 1:1 Ba Stearate/AO2 |   | 67 | 84 |
| Q | 1:1 Ba Stearate/AO4 |   | 79 | 115/72[a] |
|   | AO5 |   | 69 |   |

TABLE 5-continued

PEG Decomposition Onset Difference (° C.) by TGA, for Various Antioxidant Blends

| EX | Additive (wt % in PEG) | 2.5 | 5 | 10 |
|---|---|---|---|---|
| R | 1:1 Zn Stearate/AO5 |   | 107 |   |
| S | 2.5 Zn Stearate + 2.5 Ba Stearate + 5.0 AO5 |   |   | 101 |

[a] Measurement was repeated

Metal salts of various carboxylic acids, sulfonic acids, and alkyl sulfates were also evaluated by TGA. The "Thermal Stability" method described above was used with the modification that the sample size varied from 16 mg to 20 mg. Each salt was blended at 5% by weight in PEG. The data is reported in Table 6, below.

TABLE 6

PEG Decomposition Onset and Onset Difference (° C.) by TGA, for Various Salt Additives

| EX | Salt | Measured Onset (° C.) | Difference (° C.) |
|---|---|---|---|
| T | Zn Acetate | 281 | 47 |
| U | Na Acetate | 243 | 5 |
| V | Na Caprylate | 360 | 106 |
| W | Na Laurate | 354 | 100 |
| X | Na Stearate | 318 | 73 |
| Y | Na Behenate | 321 | 67 |
|   | Mono Na C12 Phosphate | 211 | −19 |
|   | Mono/Di Mix Na C12 Phosphate | 208 | −5 |
| Z | Na Capryl Sulfonate | 288 | 50 |
| AA | Na Lauryl Sulphate | 229 | 3 |
| BB | Disodium Phthalate | 247 | 0 |
| CC | Zn Phthalate | 242 | 3 |

For comparison, end capped PEG's were also evaluated by TGA with and without zinc stearate. Zinc stearate was evaluated at 2.5% and 5% by weight the PEG. The "Thermal Stability" method described above was used with the modification that the sample size varied from 4 mg to 26 mg. The data is reported in Table 7, below.

TABLE 7

PEG Decomposition Onset by TGA

| EX | PEG Type | TGA Onset (° C.) |
|---|---|---|
|   | PEG 2000 | 210 |
|   | Me-PEG 2000 | 241 |
|   | $C_{18}$-PEG-$C_{18}$ | 236 |
| DD | 97.5 $C_{18}$-PEG-$C_{18}$/2.5 Zn Stearate | 270 |
| EE | 95 $C_{18}$-PEG-$C_{18}$/5 Zn Stearate | 300 |

Also for comparison, stearates blends with polycaprolactone (PCL) were also evaluated. The stearates were added at 10% by wt. The "Thermal Stability" method described above was used with the modification that the sample size varied from 4 mg to 26 mg. The results are reported in Table 8, below.

TABLE 8

PCL Decomposition Onset by TGA with 10 wt % Stearate

| Additive | TGA Onset (° C.) |
|---|---|
| None | 294 |
| Zn Stearate | 246 |
| Ba Stearate | 293 |
| 1:1 Zn Stearate/Ba Stearate | 250 |

Any of Synergists A through EE can be combined with a fluoropolymer or silicone-containing polymer processing additive and used with an extrudable thermoplastic polymer, for example, a polyolefin that may be homogeneously catalyzed or metallocene catalyzed.

PPA Examples 1 and 2 and Comparative Example A

PPA Examples 1 and 2 and Comparative Example A were prepared for TGA analysis by blending 3M DYNAMAR POLYMER PROCESSING AID FX-9613 with PEG and other components, each in powder form. The amounts of powder shown in Table 9 were blended and homogenized in a SPEX CertiPrep Freezer Mill Model 6750 using two cycles, with 5 min cooling and 5 min milling per cycle. The PPA's were then analyzed by TGA using the "Thermal Stability method described above with the modification that the sample size varied from 16 mg to 20 mg. The results are reported in Table 9. TGA derivative curves were also generated, and the data showed that the thermal stability improvement provided by stearate is also observed in PPA formulations.

TABLE 9

PPA examples with thermal stability

| Example | Blend | TGA Onset (° C.) |
|---|---|---|
| CEA | 1 g "FX-9613" + 2 g PEG 8000 | 244 |
| EX1 | 1 g "FX-9613" + 1.9 g PEG 8000 + 0.10 g Zn Stearate | 333 |
| EX2 | 1 g "FX-9613" + 1.80 g PEG 8000 + 0.10 g Zn Stearate + 0.10 g MgO | 344 |

Example 3 and Comparative Example B

Comparative Example B was prepared by blending 50 g of FX 9613 and 100 g of PEG 8000. Example 3 was prepared by blending 50 g of FX 9613 and 95 g of PEG 8000 and 5 g of Zn Stearate. Both samples of PPA were blended by shaking vigorously in a plastic bag.

The PPA additives were compounded into MB at a level of 3% in LLDPE 0.5. The MB's were prepared in 3 kg batches feeding separately the host resin and the PPA to a laboratory scale, intermeshing, counter rotating, unvented, air-cooled, conical twin screw (HaakeBuchler Rheomix TW-100) with a front inside diameter of 20 mm. The LLDPE 0.5 was gravity fed to the throat of the extruder, exposed to air at a rate of 50 g/min. The PPA was fed in the same location at a rate of 1.5 g/min. The extruder specific temperature profile of the 3 barrel zones (feed, metering, mixing), and die zone was 170/190/200/200° C. respectively. The extruder was run at 150 rpm for the first "compounding" pass. The second pass was run with the same temperature profile but at 90 rpm while flood feeding the material. A 4 minute "purge" of material was discarded at the beginning each pass.

Half the MB was subjected to a high temperature compounding by gravity feeding them to the throat of the extruder, exposed to air at a rate of 50 g/min. The extruder specific temperature profile of the 3 barrel zones (feed, metering, mixing), and die zone was 170/220/260/260° C. respectively. The extruder was run at 150 rpm for the first "compounding" pass. The 2nd pass was run with the same temperature profile but at 90 rpm while flood feeding the material. A 4 minute "purge" of material was discarded at the beginning each pass.

The MB samples were diluted to a level of 1000 ppm by blending them with LLDPE 0.5 (shaken vigorously in a bag) and extruding though the same equipment. The extruder specific temperature profile of the 3 barrel zones (feed, metering, mixing), and die zone was 170/190/200/200° C. respectively. The extruder was run at 50 rpm for the first pass. The second pass was run with the same temperature profile but at 90 rpm. For both passes, flood feeding of the material was used. A 4 minute "purge" of material was discarded at the beginning each pass.

Extrusion performance was tested using a Rosand capillary rheometer at 190° C. with a 16×1 mm 180° entry die. For each formulation, the barrel was filled with resin and the formulation was pushed through the die at a shear rate of 250/s. After the barrel was emptied under those conditions, the barrel and die face were cleaned (but the capillary was not emptied). The barrel was re-filled with the same formulation which was extruded at 250/s until the pressure was stable (~¼ barrel). The remainder of the barrel was extruded using a sequence of shear rates (25, 40, 60, 100, 150, 250, 400, 600/s), until equilibrium pressure was reached in each case. The pressure of the PPA containing formulation was compared to the neat LLDPE 0.5 pressure and the difference (Pressure Reduction, expressed as a % of the neat resin) was recorded. The results for the low shear rates are reported in Table 10.

TABLE 10

Pressure Reduction for CEB and EX3, compounded at 200° C. and 260° C.

| | MB Compounding Temperature | | | |
|---|---|---|---|---|
| | 200° C. | 200° C. | 260° C. | 260° C. |
| Shear Rate (1/s) | CEB FX-9613 + PEG 8000 | EX3 FX-9613 + PEG 8000 + Zn Stearate | CEB FX-9613 + PEG 8000 | EX3 FX-9613 + PEG 8000 + Zn Stearate |
| 25 | 15% | 24% | 9% | 20% |
| 40 | 29% | 32% | 25% | 29% |

PPA Example 4

A PPA sample was prepared by blending 33 g FX 9613, 63.7 g of PEG 8000, and 3.33 g of Zn Stearate in a plastic bag as described above in Example 3. 60 g of this mixture was used to prepare the MB described below.

PPA Example 5

A PPA sample was prepared by blending 30 g "FC-1650", 62.7 g of PEG 8000, 3.33 g of Zn Stearate, 1.6 g of talc, 0.8 g of calcium carbonate, and 1.6 g of MgO in a plastic bag as described above in Example 3. 60 g of this mixture was used to prepare the MB described below.

PPA Example 6

A PPA sample was prepared by blending 45 g "DuPONT VITON FREEFLOW Z 100", 86.5 g of PEG 8000, and 4.55 g of Zn Stearate in a plastic bag as described above in Example 3. 60 g of this mixture was used to prepare the MB described below.

PPA Example 7

A PPA sample was prepared using the method described in Example 5, except that "FC-2299" was used instead of "FC-1650".

Examples 8 to 11

Each of PPA Examples 4 to 7 was compounded into a MB at a level of 3%. The MB were prepared in 2 kg batches by shaking vigorously in a bag 1940 g of LLDPE 2.0, 2.0 g of AO6, 1.4 g of Zn Stearate, and 60 g of the PPA Example. The mixture was fed to a laboratory scale, intermeshing, counter rotating, unvented, air cooled, conical twin screw (Haake-Buchler Rheomix TW-100) with a front inside diameter of 20 mm. The mixture was gravity fed to the throat of the extruder, exposed to air at a rate of 50 g/min. The extruder specific temperature profile of the 3 barrel zones (feed, metering, mixing), and die zone was 170° C./190° C./200° C./200° C. respectively. The extruder was run at 150 RPM for the first "compounding" pass. The 2nd pass was run with the same temperature profile but at 90 RPM while flood feeding the material. A 4 minute "purge" of material was discarded at the beginning each pass. The melt fracture performance was evaluated using LLDPE 0.9. Examples 8 to 11 were made using a blown film line from Reifenhaiuser Kiefel, Sankt Augustin, Germany, with a 40 mm, 24/1, grooved feed extruder. The die was of spiral design with a 40-mm diameter and 0.9-mm die gap (36 mil).

A "time to clear melt fracture" evaluation was done by diluting the MB to a target level of 325 ppm in the host resin at 230° C. (450° F.), 0.9 mm (36 mil) gap, 14 L/D, 10.5 kg/h (23 lb/h), and 220/s, in combination with 6000 ppm of talc (Ampacet MB #101558 available from Ampacet Corporation, Tarrytown, N.Y.) and 1000 ppm of Erucamide (Ampacet MB #10090 available from Ampacet Corporation). After an hour of running at 325 ppm, the level was increased by 300 ppm every subsequent hour up to 1225 ppm. The pressure was recorded every 10 minutes and a sample of film was collected. The film was examined for the presence of melt fracture, and the time corresponding to the disappearance of the last band of melt fracture or time to clear melt fracture was recorded (TTC). The results are shown in Table 11, below.

TABLE 11

Time to Clear Melt Fracture in Film at 230° C. (450° F.)

| Example | PPA Example | Time to Clear Melt Fracture (minutes) |
|---|---|---|
| 8 | 4 | 230 |
| 9 | 5 | 140 |
| 10 | 6 | 80 |
| 11 | 7 | 160 |

Various modifications and alterations of this disclosure may be made by those skilled the art without departing from the scope and spirit of the disclosure, and it should be understood that this invention is not to be unduly limited to the illustrative embodiments set forth herein.

What is claimed is:

1. A composition comprising:
   a polyolefin;
   a polymer processing additive selected from the group consisting of a fluoropolymer and a silicone-containing polymer; and
   a polymer processing additive synergist comprising a polyethylene glycol and a metal salt selected from the group consisting of a metal salt of an aliphatic carboxylic acid, a metal salt of an aliphatic sulfonic acid, and a metal salt of an alkylsulfate, wherein the polyethylene glycol is present in an amount of at least 85% by weight, based on the total weight of the polymer processing additive synergist, and wherein the metal salt is a sodium, potassium, aluminum, or barium salt.

2. The composition of claim 1, wherein the polymer processing additive synergist comprising the polyethylene glycol and the metal salt has higher thermal stability than the polyethylene glycol alone.

3. The composition of claim 1, wherein the metal salt is the metal salt of an aliphatic carboxylic acid or the metal salt of an aliphatic sulfonic acid.

4. The composition of claim 3, wherein the metal salt is the metal salt of an aliphatic carboxylic acid, and wherein the aliphatic carboxylic acid is other than stearic acid.

5. The composition of claim 1, further comprising an at least one of an antioxidant, a metal oxide, or a hindered amine light stabilizer.

6. The composition of claim 1, wherein the metal salt is present in an amount of at least 5% by weight, based on the total weight of the polymer processing additive synergist.

7. The composition of claim 1, wherein the polyolefin is a linear low density polyethylene.

8. The composition of claim 1, wherein the polyolefin is made by homogeneous catalysis with a metallocene catalyst.

9. The composition of claim 1, wherein the polymer processing additive is a fluoropolymer having a Mooney viscosity ML 1+10 @ 121° C. in a range from 30 to 90.

10. The composition of claim 1, wherein the combined weight of the polymer processing additive and the polymer processing additive synergist is in a range from 0.01 percent to 10 percent, based on the total weight of the composition.

11. The composition of claim 1, wherein the polymer processing additive is a fluoropolymer.

12. The composition of claim 1, wherein the polymer processing additive is a silicone-containing polymer.

13. The composition of claim 1, wherein the metal salt is a sodium or potassium salt.

14. A method of reducing melt defects during the extrusion of the polyolefin, the method comprising extruding the composition of claim 1.

15. A composition comprising:

a polyolefin;

a polymer processing additive selected from the group consisting of a fluoropolymer and a silicone-containing polymer; and a polymer processing additive synergist comprising a polyethylene glycol and a metal salt selected from the group consisting of a metal salt of a carboxylic acid and a metal salt of a sulfonic acid, wherein the metal salt is a sodium or potassium salt, and wherein the polyethylene glycol is present at least at 85% by weight, based on the total weight of the polymer processing additive synergist.

16. The composition of claim 15, wherein the polyolefin is a linear low density polyethylene.

17. The composition of claim 15, wherein the polymer processing additive is a fluoropolymer having a Mooney viscosity ML 1+10 @ 121° C. in a range from 30 to 90.

18. The composition of claim 15, wherein the metal salt is present in an amount of at least 5% by weight, based on the total weight of the polymer processing additive synergist.

19. The composition of claim 1, wherein the polyolefin is made with a metallocene catalyst.

20. The composition of claim 1, wherein the polyolefin is made with a single-site catalyst.

\* \* \* \* \*